United States Patent
Lyu

(10) Patent No.: US 11,309,950 B2
(45) Date of Patent: Apr. 19, 2022

(54) DATA TRANSMISSION METHOD AND APPARATUS

(71) Applicant: HUAWEI TECHNOLOGIES CO., LTD., Guangdong (CN)

(72) Inventor: Rui Lyu, Chengdu (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/875,070

(22) Filed: May 15, 2020

(65) Prior Publication Data

US 2020/0280361 A1 Sep. 3, 2020

Related U.S. Application Data

(63) Continuation of application No. PCT/CN2017/111627, filed on Nov. 17, 2017.

(51) Int. Cl.
| | | |
|---|---|---|
| H04B 7/06 | (2006.01) |
| H04W 76/22 | (2018.01) |
| H04W 76/11 | (2018.01) |
| H04W 36/06 | (2009.01) |
| H04W 72/04 | (2009.01) |

(52) U.S. Cl.
CPC ........ *H04B 7/0695* (2013.01); *H04W 36/06* (2013.01); *H04W 72/046* (2013.01); *H04W 76/11* (2018.02); *H04W 76/22* (2018.02)

(58) Field of Classification Search
CPC .......... H04W 72/042; H04W 72/1289; H04W 92/10; H04W 48/12; H04W 36/06; H04W 72/046; H04W 76/22; H04W 76/11; H04B 7/0695; H04B 7/0617; H04B 7/088
See application file for complete search history.

(56) References Cited

U.S. PATENT DOCUMENTS

| | | | |
|---|---|---|---|
| 2015/0334726 A1 | 11/2015 | Gao et al. | |
| 2017/0302341 A1* | 10/2017 | Yu | ............ H04W 72/0446 |
| 2018/0295006 A1 | 10/2018 | Ren et al. | |

(Continued)

FOREIGN PATENT DOCUMENTS

| | | |
|---|---|---|
| CN | 103875271 A | 6/2014 |
| CN | 105227486 A | 1/2016 |
| CN | 105959057 A | 9/2016 |

(Continued)

*Primary Examiner* — Sophia Vlahos

(74) *Attorney, Agent, or Firm* — Womble Bond Dickinson (US) LLP

(57) ABSTRACT

A data transmission method and an apparatus are disclosed. The method includes: generating, by a first transmit device, a data frame sequence, where the first data frame sequence includes a first data frame, the first data frame includes a switching interval, the switching interval includes first identification information, and the first data frame corresponds to a first data period; detecting, by the first transmit device, whether a beam adjustment request is received within the first data period, and if the beam adjustment request is received, setting the first identification information in the switching interval of the first data frame to invalid; or if no beam adjustment request is received, setting the first identification information to valid; and sending, by the first transmit device, the first data frame.

17 Claims, 15 Drawing Sheets

(56) References Cited

U.S. PATENT DOCUMENTS

2018/0310322 A1* 10/2018 Zhang .................. H04B 7/0604

FOREIGN PATENT DOCUMENTS

| CN | 106793059 A | 5/2017 |
| CN | 106899527 A | 6/2017 |
| JP | 2014527367 A | 10/2014 |
| WO | 2016129417 A1 | 8/2016 |
| WO | 2017022422 A1 | 2/2017 |
| WO | 2017101821 A1 | 6/2017 |
| WO | 2017114021 A1 | 7/2017 |

* cited by examiner

DATA TRANSMISSION METHOD AND APPARATUS

CROSS-REFERENCE TO RELATED APPLICATIONS

This application is a continuation of International Application No. PCT/CN2017/111627, filed on Nov. 17, 2017, the disclosure of which is hereby incorporated by reference in its entirety.

TECHNICAL FIELD

The present disclosure relates to the field of beamforming and beamsteering technologies, and in particular, to a data transmission method and an apparatus that are applied to a beam switching system.

BACKGROUND

In a 5G wireless communications system and a new-generation microwave backhaul/fronthaul communications system, beamforming (BF) and beamsteering (BS) technologies can be used to control a shape and a direction of a beam generated by an antenna unit, to achieve special communication effects such as a spatial multiplexing efficiency improvement, interference suppression, mobile terminal tracking, and anti-shake, thereby greatly improving a transmission capacity and reliability.

The beamforming and beamsteering technologies in the systems are mainly implemented in the following two manners. One manner is a multi-channel combination. As shown in FIG. 1a, a shape and a direction of a combined beam are changed by controlling phase changes of an electrical signal or an electromagnetic wave signal on different channels. In this case, a main device in a circuit system is a phase shifter. The other manner is a multi-channel switching. As shown in FIG. 1b, a fixed beam shape and a fixed beam direction are preset in an antenna unit corresponding to each channel, and a shape and a direction of a final beam are changed by switching and controlling a channel selected by an electrical signal or an electromagnetic wave signal. In this case, a main component in a circuit system is a switch.

For a configurable component such as the phase shifter or the switch, a status change of the component requires a particular action time, and a status of the component in an action process is usually uncertain. Affected by this, signal quality on a circuit in this time period is also unreliable. However, in the 5G communications system and the high-speed backhaul system, due to carrier aggregation and use of high frequency band resources, extremely large signal bandwidth causes very short duration of a symbol sample. In this case, use of the BF or BS technology may cause deterioration or even interruption of data transmission in a beam adjustment process.

To prevent normal communication from being affected, the system usually fills redundant and invalid data in a data flow during beam adjustment and switching, to avoid damage caused by an unstable status of the component to transmission of valid communication data. To balance a lossless data transmission requirement and a beam switching requirement, a processing technology is that when there is a beam switching requirement, a switching interval is temporarily allocated, data transmission is suspended, and switching is completed. In this case, for a transmission link, a transmitter may actively suspend a valid data flow during beam switching, and fill the switching interval. When performing beam switching, a receiver needs to send, to the peer transmitter, a request for allocating a switching interval. A data flow structure of the request is shown in FIG. 2.

Although the data flow structure for on-demand switching interval allocation can improve transmission efficiency while ensuring switching frequency, the receiver needs to send the request to the peer transmitter when performing beam switching. This interaction process causes a relatively large delay, and further reduces timeliness of the beam switching of the receiver. Consequently, the system cannot trace a location, shake, and the like of the terminal.

SUMMARY

The present disclosure provides a data transmission method and an apparatus, to improve switching efficiency during beam switching and reduce a delay.

According to a first aspect, the present disclosure provides a data transmission method. The method is applied to a first network device, and the first network device may include a first transmit device and a first receive device. The method includes: generating, by the first transmit device, a first data frame sequence, where the first data frame sequence includes at least one data frame, for example, includes a first data frame, the first data frame includes a switching interval, the switching interval includes first identification information, the first identification information is used to indicate validity of data in the switching interval of the first data frame, and the first data frame corresponds to a first data period; detecting, by the first transmit device, whether a beam adjustment request is received within the first data period, and if the beam adjustment request is received, setting the first identification information in the switching interval of the first data frame to invalid; or if no beam adjustment request is received, setting the first identification information to valid; and sending, by the first transmit device, the first data frame.

The first identification information may indicate the validity of the data in the switching interval in the binary mode, or may indicate the validity of the data in the switching interval by using a sequence string. For example, when the sequence string is used to indicate the validity of the data in the switching interval, a correlation operation is performed on the sequence string; and if the sequence string is similar to a sequence string of the first identification information, it indicates that the data in the switching interval is valid; otherwise, it indicates that the data is invalid. In addition, the validity of the switching interval may alternatively be indicated in another manner. This is not limited in the present disclosure.

According to the method provided in this aspect, the transmit device generates the data frame or the data frame sequence that carries the first identification information, and sets validity of the identification information based on a status of receiving the beam adjustment request, so that when receiving the data frame, the receive device can determine, based on the validity of the first identification information in the data frame, whether the transmit device is performing beam adjustment, and perform a corresponding feedback action based on a status of the transmit device. Therefore, the transmit device is prevented from separately sending a request to the receive device during the beam adjustment, and a transmission delay in an interaction process of sending the request is avoided, thereby improving beam switching efficiency.

With reference to the first aspect, in an implementation of the first aspect, the switching interval includes a first interval header and a first payload area, the first interval header is used to carry the first identification information, and the first payload area is used to carry data; and after the first transmit device receives the beam adjustment request within the first data period and before the first transmit device sends the first data frame, the method further includes: filling invalid data in the first payload area of the switching interval of the first data frame, and performing beam adjustment within the first data period; or after receiving no beam adjustment request within the first data period, filling valid data in the first payload area of the switching interval of the first data frame.

In this implementation, when the beam adjustment request is received, the invalid data is filled in the payload area of the switching interval, so that loss of valid data during the beam switching can be avoided; or when no beam adjustment request is received, the valid data is filled in the switching interval, so that normal transmission can be maintained.

With reference to the first aspect, in another implementation of the first aspect, the first data frame further includes a protection interval, the protection interval includes a second interval header and a second payload area, the second interval header is used to carry second identification information, and the second identification information is used to indicate validity of data in the second payload area of the protection interval; and in a process of generating the first data frame, the method further includes: setting validity of the second identification information in the protection interval of the first data frame.

In this implementation, the data frame includes the protection interval, so that when performing beam adjustment, the transmit device may migrate the data in the switching interval to the protection interval, thereby avoiding loss of valid data during switching, reducing a delay, improving switching efficiency, and ensuring security of data transmission.

With reference to the first aspect, in still another implementation of the first aspect, the setting validity of the second identification information in the protection interval of the first data frame includes:

determining, by the first transmit device, a first target switching interval based on a transmission delay and/or location information, where the first target switching interval is a switching interval of an $N^{th}$ data frame before the first data frame, or is the switching interval of the first data frame, where N is a positive integer greater than or equal to 1; and if a first data migration request is received from the first receive device, and first identification information in the first target switching interval is valid, setting the second identification information in the protection interval of the first data frame to invalid; otherwise, setting the second identification information to valid.

The transmission delay includes a time interval generated when data is transmitted from the first transmit device to a second receive device, or a time interval generated when data is transmitted from a second transmit device to the first receive device; and the location information includes a location number or a sequence number used to indicate, in the data frame sequence, a location of each data frame.

In one embodiment, another method for setting the validity of the second identification information in the protection interval of the first data frame includes: determining, by the first transmit device, a first target switching interval based on a transmission delay and/or location information, where the first target switching interval is a switching interval of an $N^{th}$ data frame before the first data frame, or is the switching interval of the first data frame, where N≥1; and if a first data migration identifier in a first data migration request received from the first receive device is true, and first identification information in the first target switching interval is valid, setting the second identification information in the protection interval of the first data frame to invalid; otherwise, setting the second identification information to valid.

With reference to the first aspect, in still another implementation of the first aspect, when the second identification information in the first data frame is invalid, the first transmit device migrates data in a first payload area of the first target switching interval to the second payload area of the protection interval of the first data frame. To ensure that all data in the switching interval is migrated to the protection interval, when a protection interval and a switching interval of each data frame are set, a length of the second payload area of the first data frame is greater than or equal to a length of the first payload area of the first target switching interval.

With reference to the first aspect, in still another implementation of the first aspect, when the first transmit device is located in a first network device; a second network device is further included, and the second network device includes a second receive device, the setting validity of the second identification information in the first data frame includes: when receiving a second data migration request from the second receive device, setting, by the first transmit device, the second identification information in the first data frame to invalid; otherwise, setting the second identification information to valid; or when receiving a second data migration request, and a second data migration identifier carried in the second data migration request is true, setting, by the first transmit device, the second identification information in the first data frame to invalid; otherwise, setting the second identification information to valid.

With reference to the first aspect, in still another implementation of the first aspect, the method further includes: when the second identification information in the second interval header of the first data frame is invalid, determining a first target switching interval based on a transmission delay and/or location information, where the first target switching interval is a switching interval of an $N^{th}$ data frame before the first data frame, or is the switching interval of the first data frame, where N≥1; and migrating data in a first payload area of the first target switching interval to the second payload area of the protection interval of the first data frame, where a length of the second payload area of the first data frame is greater than or equal to a length of the first payload area of the first target switching interval.

In this implementation, when data migration needs to be performed, to be specific, when the second identification information in the first data frame is invalid, the valid data in the switching interval of the $N^{th}$ data frame that is stored before the first data frame is received is migrated to the protection interval of the first data frame, and a length of the protection interval is greater than or equal to that of the switching interval, to ensure that all the data in the switching interval from which the data is migrated can be transferred to the protection interval, thereby ensuring security and reliability of data transmission.

With reference to the first aspect, in still another implementation of the first aspect, the method further includes: when receiving a start instruction, migrating, by the first transmit device, to-be-migrated data to a second payload area of a protection interval corresponding to each data frame, starting from migrating the data in the first payload area of the first target switching interval to the second payload area of the first data frame; and when receiving a stop instruction, stopping, by the first transmit device, data migration starting from a next data frame.

In this implementation, when receiving the beam adjustment request within a plurality of consecutive data periods, the receive device sends a continuous start instruction to the transmit device. The process of continuous data migration and stopping the data migration can avoid data loss caused when a system tracks a target object that moves quickly or shakes. In other words, in this implementation, when a target object moves quickly or shakes, it can be ensured that tracked data is not lost, thereby ensuring accuracy of tracking and positioning.

According to a second aspect, the present disclosure further provides a data transmission method. The method may be applied to a first network device, and the first network device includes a first transmit device and a first receive device. Specifically, the method includes: receiving, by the first receive device, a second data frame sequence, where the second data frame sequence includes at least one data frame, for example, includes a second data frame, the second data frame includes a switching interval, the switching interval includes a first interval header and a first payload area, and the first interval header includes first identification information, used to indicate validity of data in the first payload area of the switching interval; detecting, by the first receive device, whether the first identification information in the switching interval of the second data frame is valid, and if the first identification information is invalid, generating a first data migration request; and sending, by the first receive device, the first data migration request.

With reference to the second aspect, in an implementation of the second aspect, the second data frame corresponds to a second data period, and the method further includes: detecting, by the first receive device within the second data period, whether a beam adjustment request is received; and if the beam adjustment request is received, discarding the data in the first payload area of the switching interval of the second data frame, and setting a received data migration identifier in the switching interval of the second data frame, or attaching a label on the switching interval, to indicate that data needs to be received in the switching interval; or if no beam adjustment request is received, continuing to receive data within the second data period.

With reference to the second aspect, in another implementation of the second aspect, the second data frame further includes a protection interval, the protection interval includes a second interval header and a second payload area, and the second interval header includes second identification information, used to indicate validity of data in the second payload area of the protection interval in which the second identification information is located; and the method further includes: detecting, by the first receive device, whether the second identification information in the protection interval of the second data frame is valid; and if the second identification information is valid, receiving the data in the second payload area of the second data frame; or if the second identification information is invalid, searching all switching intervals before the protection interval of the second data frame for a second target switching interval, where the second target switching interval is a switching interval that has the received data migration identifier and is closest to the protection interval of the second data frame in terms of time; and migrating the data in the second payload area of the second data frame to a first payload area of the second target switching interval.

According to a third aspect, the present disclosure further provides a data transmission method. The method may be applied to a second network device, the second network device is a peer device of a first network device, and the second network device includes a second transmit device and a second receive device. The second receive device is configured to receive a first data frame sequence generated by the first network device, and the second transmit device is configured to: generate a second data frame sequence, and send the second data frame sequence to the first network device. The method includes: receiving, by the second receive device, the first data frame sequence from the first network device, where the first data frame sequence includes a first data frame, the first data frame includes a switching interval, and the switching interval includes first identification information; detecting whether the first identification information in the switching interval of the first data frame is valid; if the first identification information is valid, detecting whether a beam adjustment request is received within a first data period corresponding to the first data frame; and if the beam adjustment request is received, generating a second data migration request, and sending the second data migration request to the first transmit device; and discarding data in a first payload area of the switching interval of the first data frame, and setting a received data migration identifier in the switching interval of the first data frame, where the first transmit device is located in the first network device.

In one embodiment, the generating a second data migration request includes: generating a second data migration identifier whose content is true and the second data migration request; and the sending, by the second receive device, the second data migration request to the first transmit device includes: sending, by the second receive device, the second data migration identifier whose content is true to the first transmit device by using the second data migration request.

With reference to the third aspect, in another implementation of the third aspect, the first data frame further includes a protection interval, the protection interval includes a second interval header and a second payload area, and the second interval header includes second identification information, used to indicate validity of data in the second payload area of the first data frame; and the method further includes: detecting, by the second receive device, whether the second identification information in the first data frame is valid; and if the second identification information is valid, continuing to receive the data in the second payload area of the first data frame; or if the second identification information is invalid, searching all switching intervals before the protection interval of the first data frame for a first target switching interval, where the first target switching interval is a switching interval that has the received data migration identifier and is closest to the protection interval of the first data frame in terms of time; and migrating the data in the second payload area of the protection interval of the first data frame to a first payload area of the first target switching interval.

With reference to the third aspect, in still another implementation of the third aspect, the method further includes: if the second receive device receives the beam adjustment request within a data period corresponding to at least one consecutive data frame after the first data frame is received, generating a start instruction, where the start instruction is used to instruct the first transmit device to perform a continuous data migration operation; and sending, by the second receive device, the start instruction to the first transmit device; and if the second receive device receives no beam adjustment request within a data period corresponding to at least one consecutive data frame after the start instruction is generated, generating a stop instruction, where the stop instruction is used to instruct the first transmit device to stop the continuous data migration operation; and sending, by the second receive device, the stop instruction to the first transmit device.

In this implementation, the second receive device sends the start instruction and the stop instruction for continuous data migration to the first transmit device based on the beam adjustment request, to instruct the first transmit device to perform data migration or stop data migration within a plurality of consecutive data periods, to accurately track a location of a target object that moves quickly or shakes, avoid data loss, and improve positioning accuracy.

According to a fourth aspect, the present disclosure further provides a transmit device. The transmit device includes a first processing unit, a first receive unit, and a first transmit unit, or further includes another unit such as a storage unit, and is configured to implement the operations of the method according to the first aspect and the implementations of the first aspect. In one embodiment, the transmit device includes a transmitter.

According to a fifth aspect, the present disclosure further provides a receive device. The receive device includes a second processing unit, a second receive unit, and a second transmit unit, or further includes another unit such as a storage unit, and is configured to implement the operations of the method according to the second aspect and the third aspect, and the implementations of the second aspect and the third aspect. In one embodiment, the receive device includes a receiver.

According to a sixth aspect, the present disclosure further provides a network device. The network device includes the transmit device according to the fourth aspect and the receive device according to the fourth aspect or the fifth aspect, and is configured to: generate a data frame sequence, and transmit a data frame in the data frame sequence. Each data frame includes a switching interval and a protection interval, the switching interval includes first identification information, and the protection interval includes second identification information. Each of the first identification information and the second identification information is used to indicate validity of data in the interval in which the first identification information or the second identification information is located. In addition, as indicated by the identification information, a status of a current device and an action that needs to be performed are notified to a device at the other end, so that a transmit device or a receive device at one end is prevented from sending a request to the other end again, an increase in a transmission delay is avoided, and reduction of timeliness of beam switching is avoided.

In one embodiment, the first identification information and the second identification information may be set at interval headers of corresponding intervals.

In one embodiment, each data frame in the data frame sequence may further include location information, and the location information is location numbers set for all the data frames in the data frame sequence, and is used to indicate locations of the data frames in the data frame sequence. Further, the location information may be configured in the protection interval of each data frame.

In one embodiment, in terms of hardware implementation, the network device may further include components such as a transceiver, a processor, and a memory. The transceiver is configured to implement data sending or receiving functions related to the transmit device and the receive device, for example, sending the data frame, receiving the beam adjustment request, and sending the data migration request. The processor is configured to implement functions of the processing unit, for example, generate the data frame, determine and set the validity of the identification information, and migrate the data. The memory is configured to store the transmitted data, the identification information, the beam adjustment request, the data migration request, and the like.

According to a seventh aspect, the present disclosure further provides a computer storage medium. The computer storage medium may store a program, and when the program is executed, some or all of the operations in the embodiments of the data transmission method provided in the present disclosure can be performed. In one embodiment, the storage medium may be stored in a memory of a network device, and is controlled by a processor.

According to an eighth aspect, the present disclosure further provides a transmission system, used for beam switching. The system includes at least two network devices, and each network device may be the network device according to the sixth aspect, or includes the transmit device according to the fourth aspect and the receive device according to the fifth aspect, and the system is configured to implement the data transmission method according to the first aspect and the implementations of the first aspect of the present disclosure.

According to the data transmission method and the apparatus that are provided in the present disclosure, a transmit device or a receive device in a network device at one end sets identification information in a data frame, and the identification information may be used to indicate validity of data in an interval in which the identification information is located, and sends and receives the data frame in a data frame sequence. In this way, both devices at two ends can independently learn of a transmission status of the device at the peer end, and perform a corresponding action based on the status, so that no instruction or notification needs to be fed back for starting and responding to data migration, thereby reducing a transmission delay and improving beam switching efficiency.

In addition, when a density of feedback instructions is increased, a site adaptively switches to a special working mode, to perform continuous data migration without needing feedbacks from the peer end, thereby avoiding a decrease in timeliness of beam switching of a receiver due to a feedback delay.

DESCRIPTION OF EMBODIMENTS

To make a person skilled in the art understand the technical solutions in the embodiments of the present disclosure better, and make the objectives, features, and advantages of the embodiments of the present disclosure clearer, the following further describes the technical solutions in the embodiments of the present disclosure in detail with reference to the accompanying drawings.

Before the technical solutions of the embodiments of the present disclosure are described, an application scenario of the embodiments of the present disclosure is first described. The present disclosure is applied to a 5G wireless communications system or a next-generation microwave backhaul/fronthaul communications system, and for beam adjustment and beam switching in a beamforming (BF) system and a beamsteering (BS) system, the present disclosure provides a data transmission method in which a dynamic switching interval and a dynamic protection interval are interleaved.

According to the method, a switching interval can be dynamically enabled based on a change in switching frequency, and transmission efficiency of valid data can be adjusted, so that a receive device, such as a receiver, and a transmit device, such as a transmitter, can independently start data migration and perform data switching, thereby improving beam switching efficiency and avoiding a waste of transmission resources.

Figure 1A:
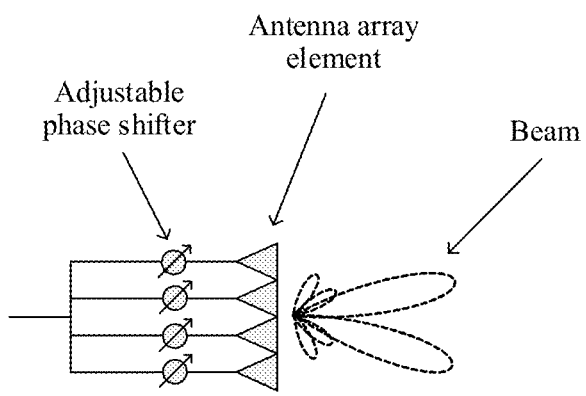
FIG. 1a is a schematic diagram of a beam control technology based on channel combination.
Figure 1B:
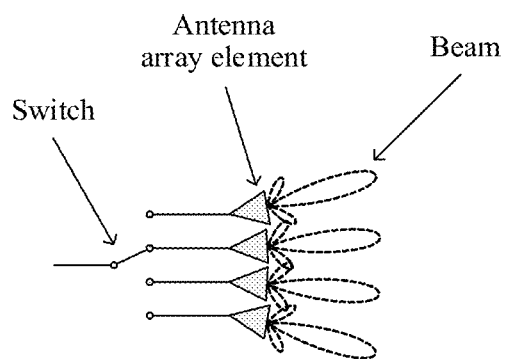
FIG. 1b is a schematic diagram of a beam control technology based on channel switching.
Figure 2:
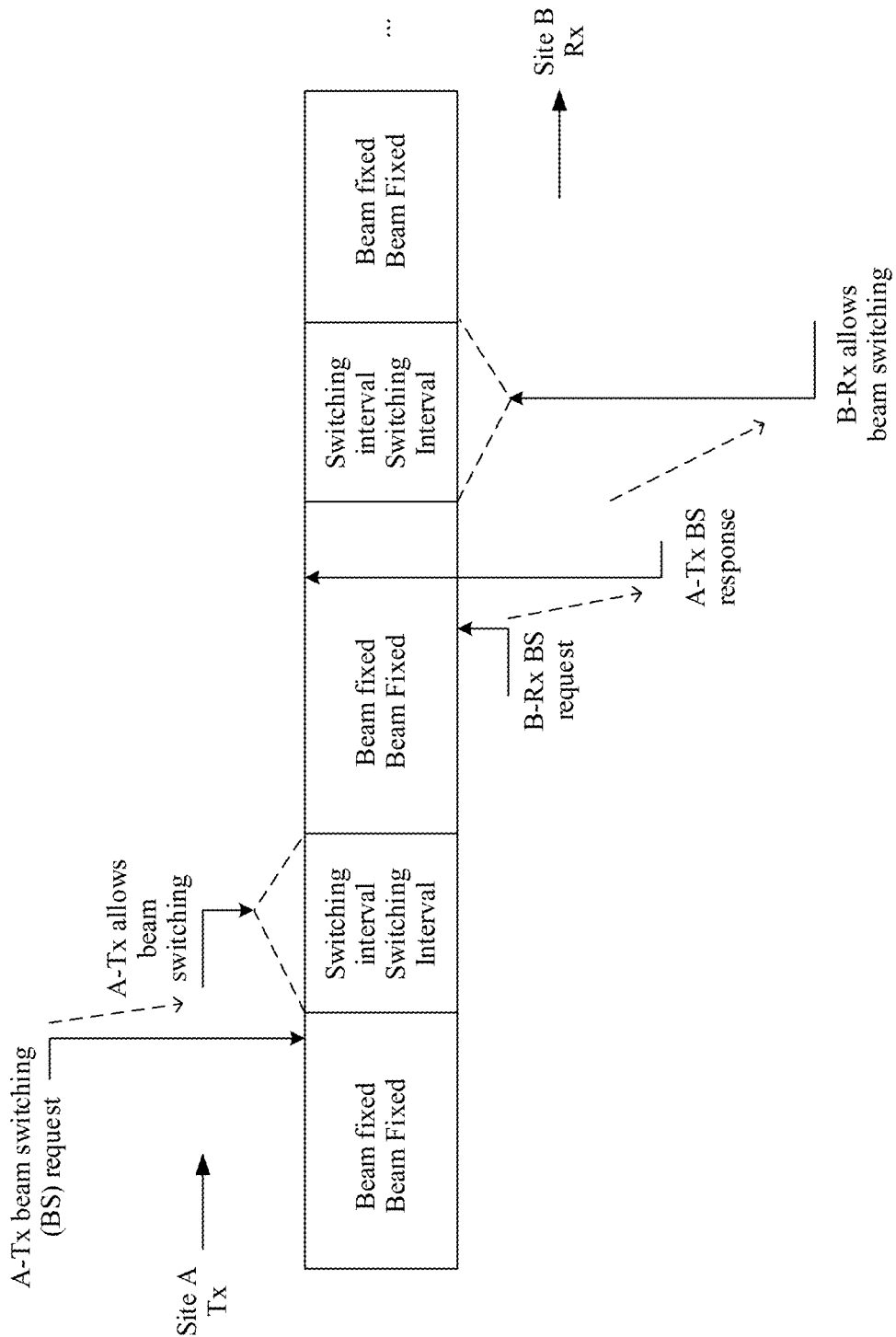
FIG. 2 is a schematic structural diagram of a data frame sequence to which a switching interval needs to be allocated on-demand.
Figure 3:
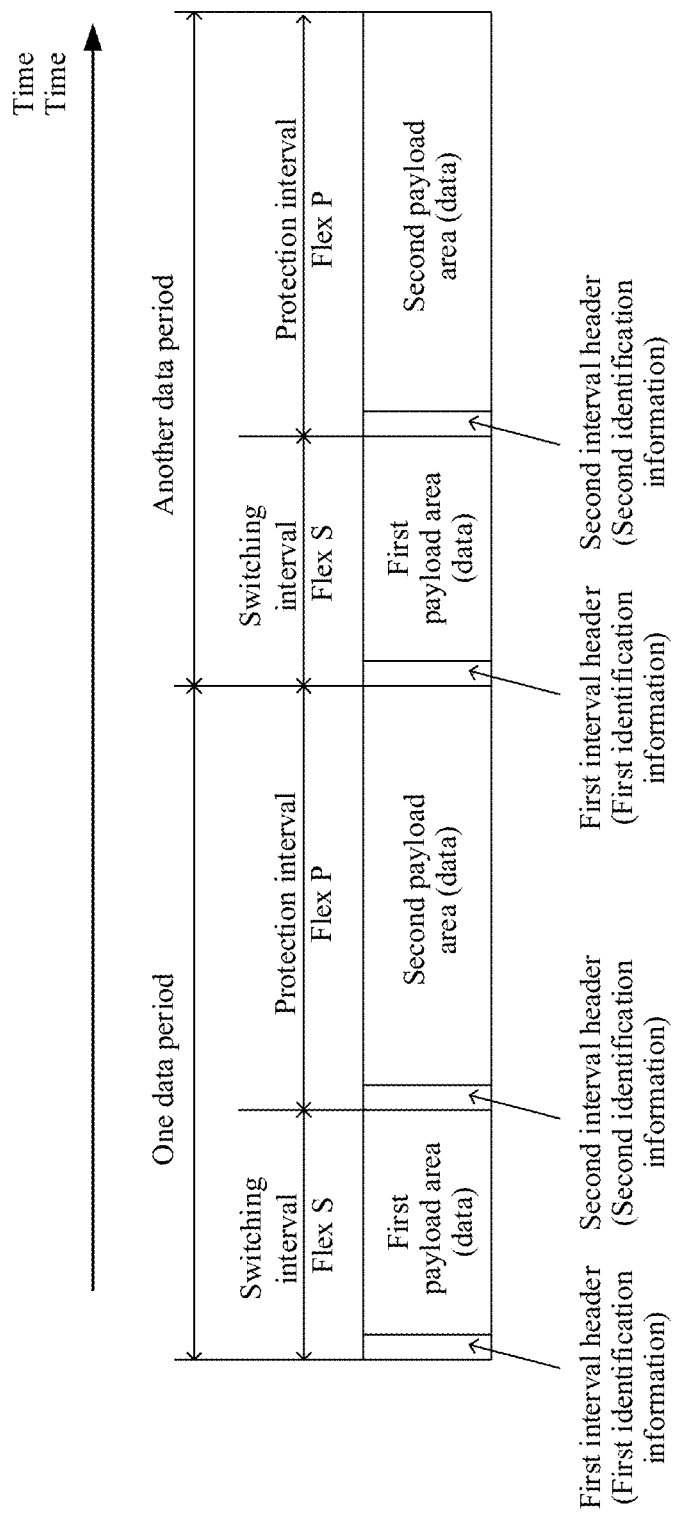
FIG. 3 is a schematic structural diagram of a data frame according to an embodiment of the present disclosure.

Specifically, the technical solutions provided in the present disclosure are based on a data frame sequence including a fixed data frame structure. As shown in FIG. 3, the sequence includes a plurality of data frames having a same structure, and each data frame includes a switching interval (for example, Flex S) and a protection interval (for example, Flex P). Each switching interval includes a first interval header and a first payload area, the first interval header is used to carry first identification information, the first payload area is used to carry valid or invalid data, and the first identification information is used to indicate validity of the data in the first payload area. Similarly, each protection interval includes a second interval header and a second payload area, the second interval header is used to carry second identification information, the second payload area is used to carry valid or invalid data, and the second identification information is used to indicate validity of the data in the second payload area.

In addition, each data frame corresponds to a transmission time period. In the following embodiments of the present disclosure, one data frame is defined to correspond to one data period. In the data period, the transmit device and the receive device may perform processing such as beam adjustment and data migration. In addition, in one embodiment, in each data frame, a length corresponding to the protection interval is set to be greater than or equal to a length of the switching interval, to ensure that all data in the switching interval can be migrated to the protection interval during data migration.

In one embodiment, when the data frame sequence is set, all the data frames in the sequence may be numbered in a specific order to form location information, the location information is used to indicate a location of each data frame in the data frame sequence, and the location information may be set in the protection interval of each data frame by using a location field.

During beam switching, both the transmit device and the receive device need to fill data in the switching interval and the protection interval of the data frame, and indicate validity of the data in each interval by using the identification information, to implement fast switching. Specifically, a data filling principle may follow the following rules:

First, valid data or redundant invalid data may be filled in the switching interval of each data frame as required, and data in the switching interval after migration or valid data may be filled in the protection interval of each data frame as required.

Second, the transmit device and the receive device may perform beam adjustment and switching actions in the switching interval of the data frame based on their own requirements.

Third, the transmit device may first buffer the data in the switching interval as required, and then migrate the buffered one-level or multi-level data to a corresponding protection interval.

Fourth, the transmit device may perform set and write operations on the identification information in the protection interval or the switching interval as required, for example, set the identification information from valid to invalid, or set data in a particular interval to valid or invalid. In one embodiment, the transmit device may further perform set and write operations on the location field in the protection interval.

Fifth, the receive device may receive the data frame in the data frame sequence, read the identification information in each interval in the data frame, and perform a corresponding action, such as data migration or beam adjustment, as indicated by the identification information. In one embodiment, the receive device may further read the location field in the protection interval, and further find, based on content of the location field, data that needs to be migrated.

It should be noted that the receive device and the transmit device may be components in different network devices, or may be components disposed in a same network device. This is not limited in the present disclosure.

In addition, to reduce a transmission delay and improve switching efficiency, in the technical solutions of the present disclosure, filling data in each interval of the data frame may further comply with the following principles:

1. Principle for Filling Data in a Switching Interval (Flex S)

Filling of the data in the switching interval is mainly determined based on a beam adjustment request of a transmit device (a transmitter). To be specific, when the transmit device has a beam switching requirement, invalid data is filled in the switching interval, and identification information in the switching interval is set to "invalid". Otherwise, when there is no beam switching requirement, identification information in the switching interval is set to "valid", and valid data is filled. In one embodiment, in a special working mode, the beam switching requirement of the transmit device may be ignored, invalid data is directly filled in the switching interval, and the identification information corresponding to the switching interval is set to "invalid".

2. Principle of Filling Data in the Protection Interval (Flex P)

Filling of the data in the protection interval is mainly determined by a receive device (a receiver). Usually, a processing unit of the receive device may determine whether to fill valid data or fill data in the switching interval after migration. Specifically, different data filling policies may be used based on the following two different system configurations.

Figure 4:
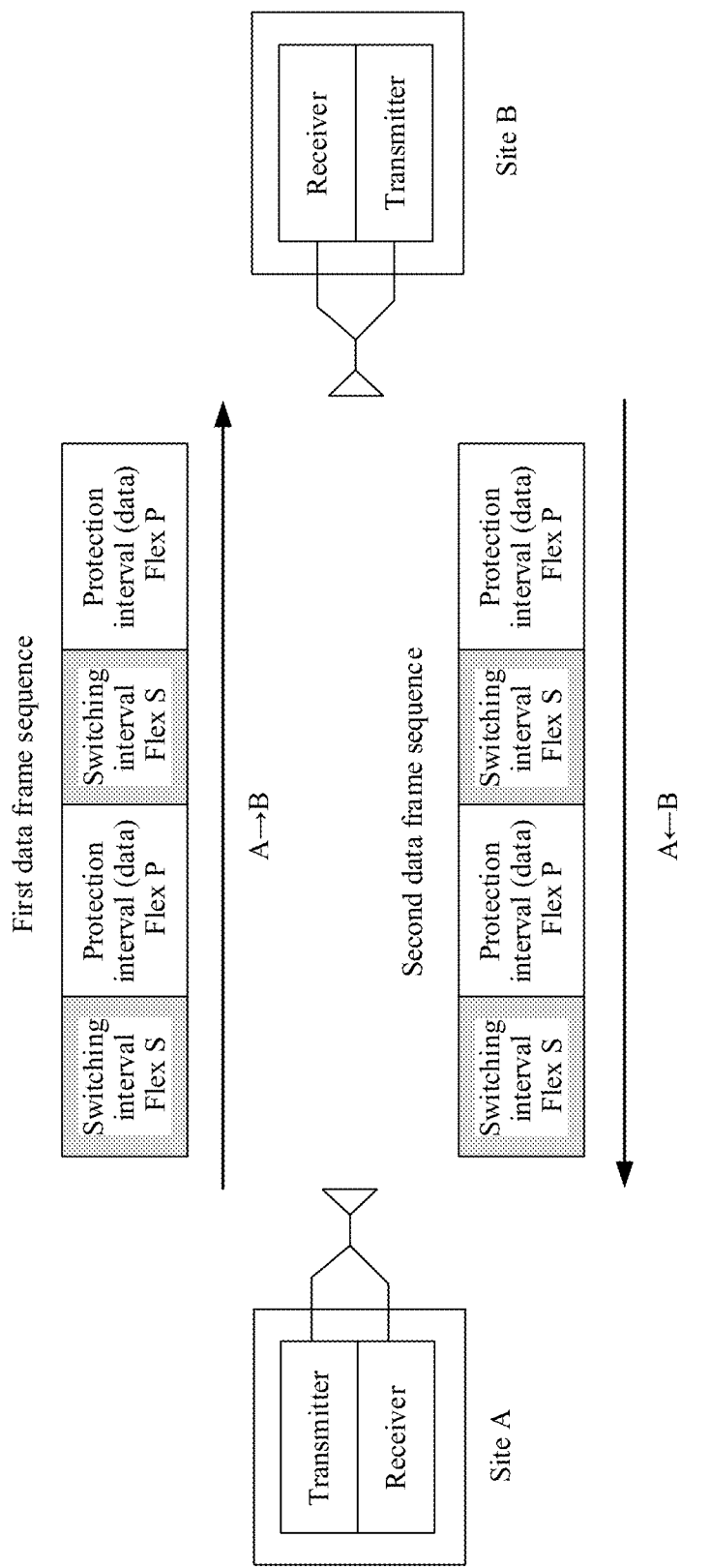
FIG. 4 is a schematic structural diagram of a first system configuration according to an embodiment of the present disclosure.

A first system configuration, as shown in FIG. 4, indicates a full-duplex mobile communications system. Two network devices, for example, respective receivers and transmitters in a site A and a site B, share one beam-adjustable antenna feeder system, and a bidirectional communication link exists between the site A and the site B. Data transmitted in one direction of the communication link is from the site A to the site B, and the data on the communication link may be carried by using a first data frame sequence and is generated by the site A. Data transmitted in the other direction of the communication link is from the site B to the site A, to be specific, the data on the communication link may be carried by using a second data frame sequence and is generated by the site B.

In the first system configuration, the transmitters in the two sites may determine, based on validity of first identification information in a previous switching interval in a to-be-sent data frame sequence and a data migration identifier sent by the local receiver, whether data migration needs to be performed. Specifically, if the identification information in the previous switching interval is "invalid", regardless of whether the data migration identifier sent by the local receiver is true, data migration does not need to be performed. If the identification information in the previous switching interval is "valid", and the data migration identifier sent by the local receiver is true, a data migration operation needs to be performed. If the identification information in the previous switching interval is "valid", and the data migration identifier sent by the local receiver is false, data migration does not need to be performed.

It should be noted that, in a process in which the transmitter determines, based on the identification information in the previous switching interval, whether to migrate data, the specific "previous" switching interval is determined based on a transmission delay and/or location information of the link. The transmission delay is a time interval generated when data is transmitted from the transmitter of the local device to the receiver of the peer device, or a time interval generated when data is transmitted from the transmitter of the peer device to the receiver of the local device. The location information is a location number or a sequence number that is preset in the data frame sequence for each data frame.

When data that needs to be migrated is determined based on the transmission delay, one possible implementation is that if the transmission delay is less than one data period, data indicated by identification information in the last switching interval is used to perform data migration; or if the transmission delay is greater than one data period and less than two data periods, data indicated by identification information in the last second switching interval is used to perform data migration. The rest can be deduced by analogy.

In the foregoing case in which data migration does not need to be performed, valid data may be filled in a protection interval, and identification information corresponding to the protection interval is set to "valid". When data migration needs to be performed, data in a previous switching interval in the data frame sequence is filled in a currently processed protection interval, and identification information in the current protection interval is set to "invalid". Further, a sequence number may be allocated to the protection interval of a current data frame, so that the receiver can quickly determine a location of the data needs to be migrated. In one embodiment, the sequence number is written to a location field corresponding to the sequence number.

Figure 5:
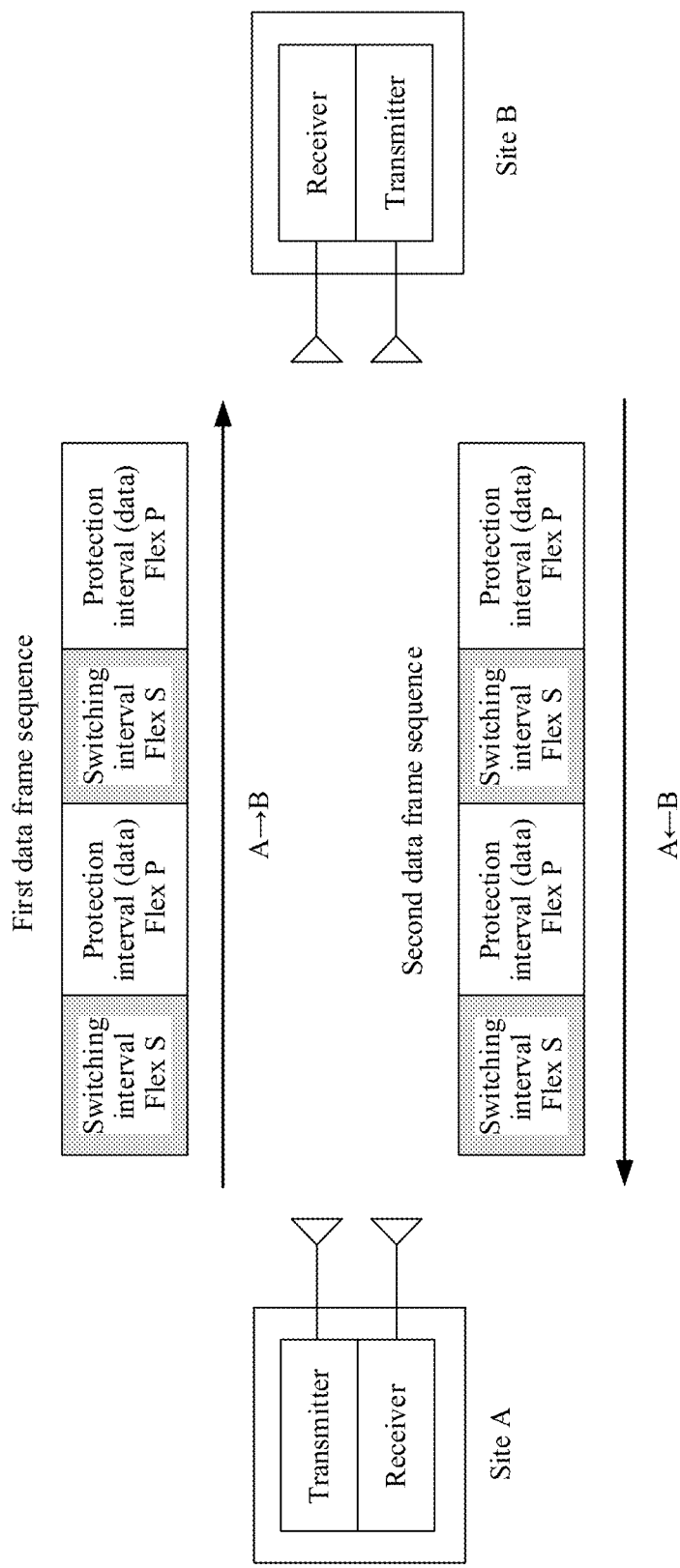
FIG. 5 is a schematic structural diagram of a second system configuration according to an embodiment of the present disclosure.

A second system configuration, as shown in FIG. 5, indicates a point-to-point microwave backhaul system. Respective transmitters and receivers of two sites in the system each have an antenna feeder system, and each antenna feeder system may independently transmit data.

In the second system configuration, the transmitter at one end may determine, based on information fed back by the peer receiver, whether data migration needs to be performed. If data migration does not need to be performed, valid data is filled in a protection interval, and identification information in the protection interval is set to "valid". If data migration needs to be performed, data in a previous switching interval in a data frame sequence is filled in a current protection interval, and identification information in the protection interval is set to "invalid". In one embodiment, a sequence number may be allocated to the current protection interval, and the sequence number is written to a location field.

In addition, in one embodiment, the second system configuration further includes a special working mode. In the special working mode, the transmitter does not determine whether a data migration request of the receiver is received, but directly fills valid data in a protection interval, and sets identification information in the protection interval to "valid".

3. Working Principle of a Receive Device (a Receiver)

The receive device or the receiver periodically receives data in a data frame sequence, reads validity of identification information in each interval in a data frame, and then determines, based on whether the identification information is valid, whether to maintain or discard data indicated by the identification information. Specifically, the receiver may determine, based on two factors: a beam switching requirement of the receiver and identification information in a switching interval, whether to discard data in the switching interval.

Specifically, if the identification information in the switching interval is "invalid", the data in the switching interval is directly discarded regardless of whether beam switching is required. If the identification information in the switching interval is "valid", and the receiver does not need to perform beam switching, valid data in the switching interval continues to be obtained. If the identification information in the switching interval is "valid", and beam adjustment needs to be performed, the receiver discards the data in the switching interval, and generates a first data migration request. Further, the first data migration request includes a first data migration identifier, and the first data migration identifier is true.

When the first data migration identifier is true, the receiver starts to monitor validity of identification information in a protection interval in a subsequent data flow, and when "invalid" identification information in a protection interval is detected, data in the protection interval is migrated to a switching interval that triggers received data migration. In one embodiment, the receiver may alternatively determine, based on a location field in a protection interval, a switching interval in which data needs to be migrated.

In the foregoing two different system configurations, the receiver may also send a data migration request in different manners. Specifically, in the first system configuration, if the receiver detects that identification information in a switching interval is "invalid", the receiver generates a first data migration request, and a first data migration identifier included in the first data migration request is true. In addition, the receiver sends the first data migration request to the local transmitter.

In the second system configuration, if the receiver detects that identification information in a switching interval is "valid", but discards data in the switching interval, the receiver sends a notification to the local transmitter, to instruct the local transmitter to perform a data migration operation.

In one embodiment, in the second system configuration, if the receiver receives a beam adjustment request in consecutive data periods, and a quantity of times of discarding data in a switching interval reaches a threshold, the receiver instructs the peer transmitter to start a special working mode. In addition, after the peer transmitter enters the special working mode, if a quantity of beam adjustment requests does not reach a threshold in a switching interval in consecutive data periods, the receiver instructs the peer transmitter to exit the special working mode.

4. Synchronization Principle in the First System Configuration and the Second System Configuration In the system defined in the first system configuration, there is a bidirectional communication link between two communications devices, and in the two devices, data flows in the bidirectional link in both transmit and receive directions are affected by a beam adjustment action. For example, for a transmit and receive co-antenna device operating in a frequency division duplex or full-duplex mode, a to-be-received data frame sequence and a to-be-sent data frame sequence are transmitted in parallel, and transmit and receive channels use a same antenna feeder system. Antenna beam adjustment affects the data flows in the transmit and receive directions.

In this system configuration, switching intervals in a bidirectional data flow are synchronously aligned, so that bidirectional data transmission can be protected when transmit and receive beams in any device are adjusted.

Figure 6A:
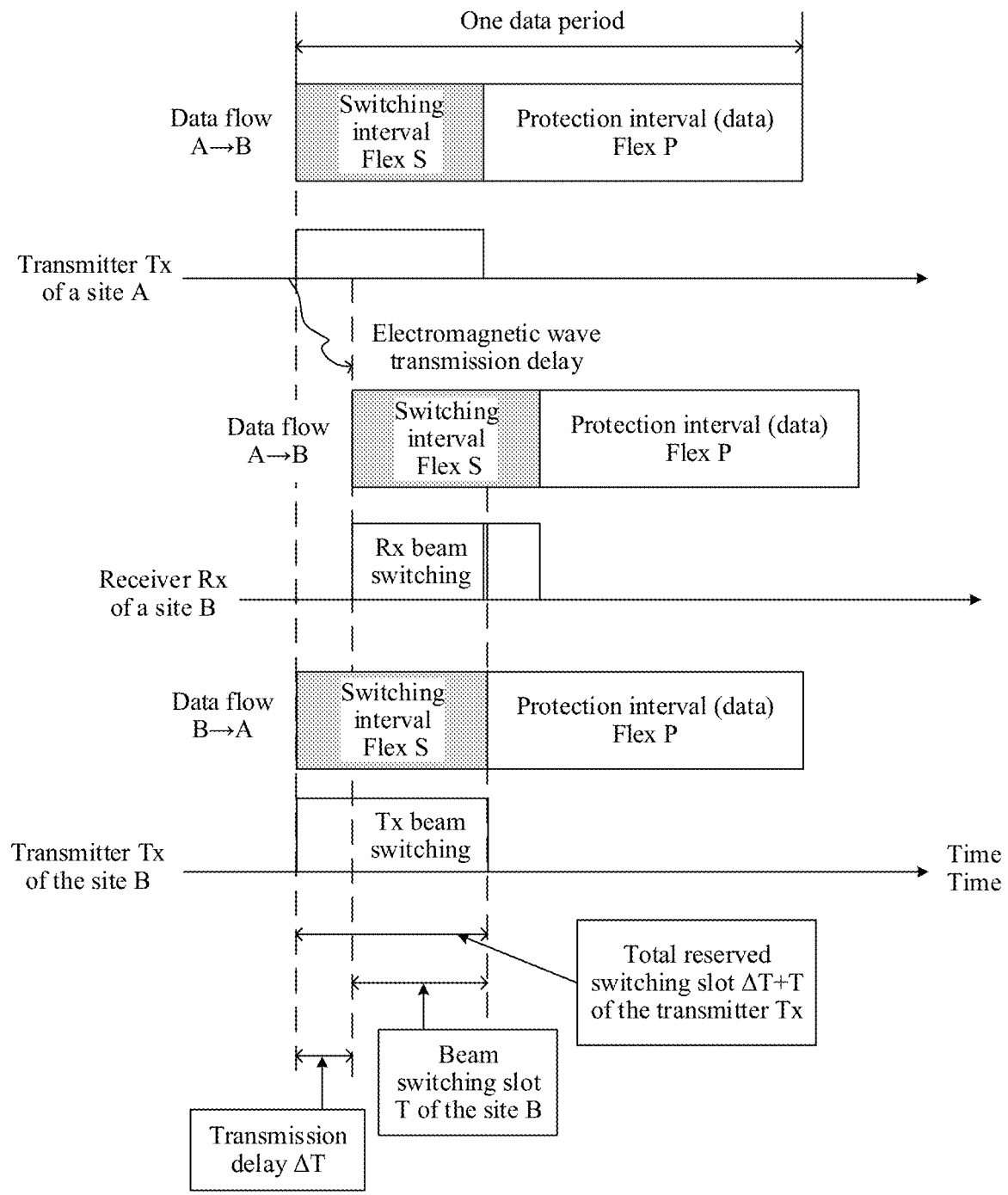
FIG. 6a is a schematic structural diagram of a synchronization data flow in the first system configuration according to an embodiment of the present disclosure.

FIG. 6a is a schematic structural diagram of a synchronization data flow in the first system configuration. It is assumed that two devices that communicate with each other are a transmitter Tx of a site A and a receiver Tx of a site B.

In a to-be-sent data frame sequence in the two devices, switching intervals are synchronously aligned. However, due to existence of an electromagnetic wave transmission delay, in a high-speed communications system, a delay of a time length $\Delta T$ exists between a data frame used to be received in a device and a data frame sent by a peer end, and the time length $\Delta T$ is less than one data period. Therefore, misplacement of the time length $\Delta T$ exists between a receive data flow and a transmit data flow of a same device. To avoid damage caused by beam adjustment to transmit and receive data flows, an actual beam adjustment action is performed within a time in which transmit and receive switching intervals overlap, to be specific, at least $\Delta T$ is added to an actual beam adjustment time for a specified time interval of a switching interval (Flex S), for example, reserved switching duration of the transmitter is $\Delta T+T$.

Figure 6B:
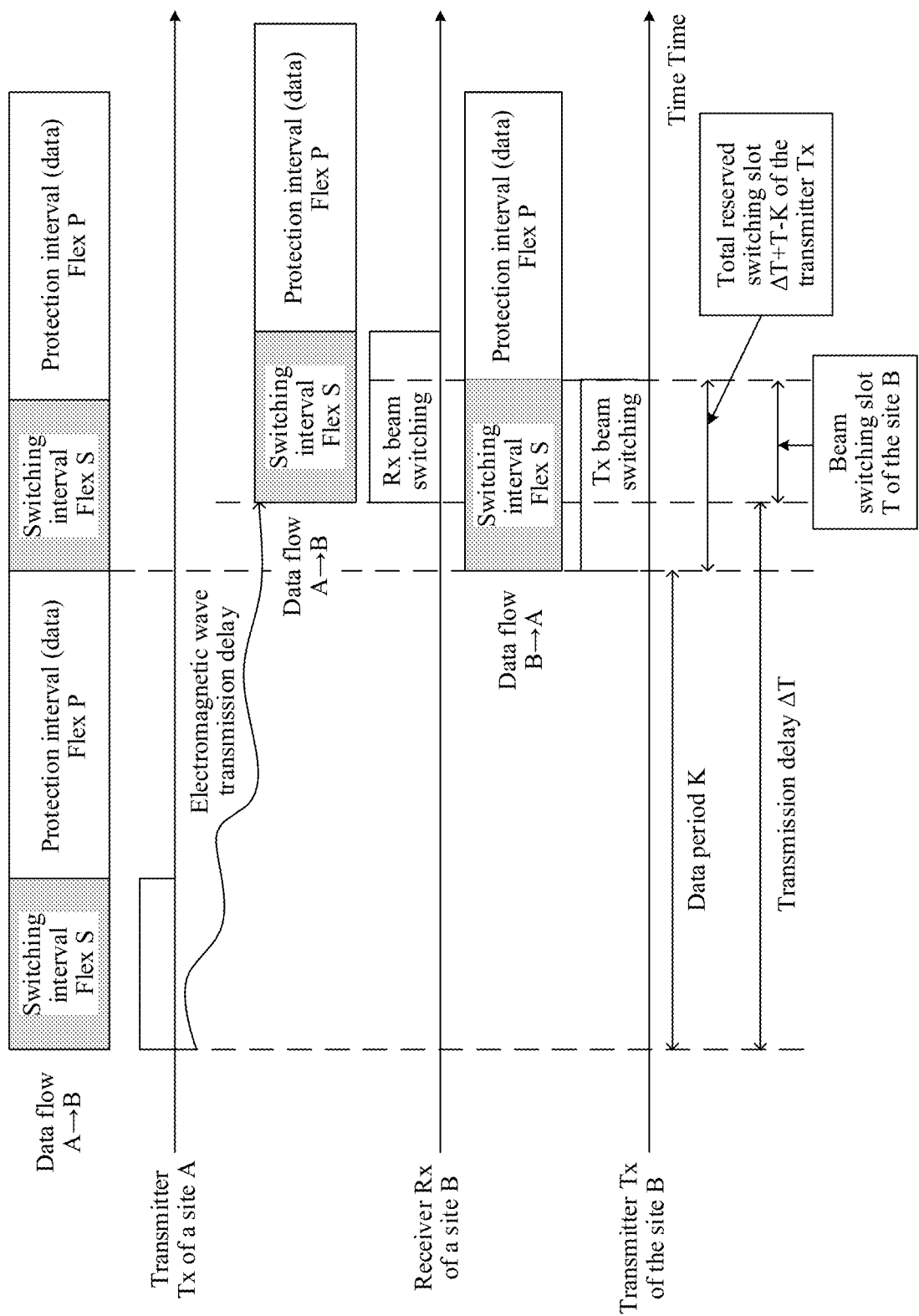
FIG. 6*b* is a schematic structural diagram of another synchronization data flow in the first system configuration according to an embodiment of the present disclosure.

As shown in FIG. 6b, another possible case is that when a transmission delay is large or a data flow structure period is extremely short, a generated transmission delay is greater than a data period. In this case, a length of a switching interval needs to be extended, to enable an overlapping area of transmit and receive switching intervals to cover actual beam adjustment duration, and to satisfy a requirement for changing the adjustment duration. In this case, the switching interval needs to be extended by $\Delta T-K$, where K represents a time length of one data period, $\Delta T$ represents a transmission delay, and the transmission delay is a time interval generated when data is transmitted from the transmitter Tx of the site A to the receiver Rx of the site B, or a time interval generated when data is transmitted from the transmitter Tx of the site B to the receiver Rx of the site A. As shown in FIG. 6b, reserved switching duration in the switching interval is $T+\Delta T-K$.

In addition, in the system defined in the second system configuration, there is only one unidirectional communication link between two communications devices. Alternatively, although there is a bidirectional communication link, in the two devices, data flows in the bidirectional link in both transmit and receive directions are not affected by a beam adjustment action. For example, for a transmit/receive independent antenna feeder device operating in a frequency division duplex mode or a full-duplex mode, adjustment of a transmit/receive beam in any device may be independently controlled. Alternatively, for a transmit and receive co-antenna device operating in a time division duplex mode, a receive data flow and a transmit data flow are alternately transmitted, and one beam adjustment action affects transmission of only one unidirectional data flow.

In this system configuration, switching intervals in a bidirectional data flow may be completely asynchronous, and a beam adjustment action in each link direction is independently performed with reference to a data flow structure in the link direction.

Figure 6C:
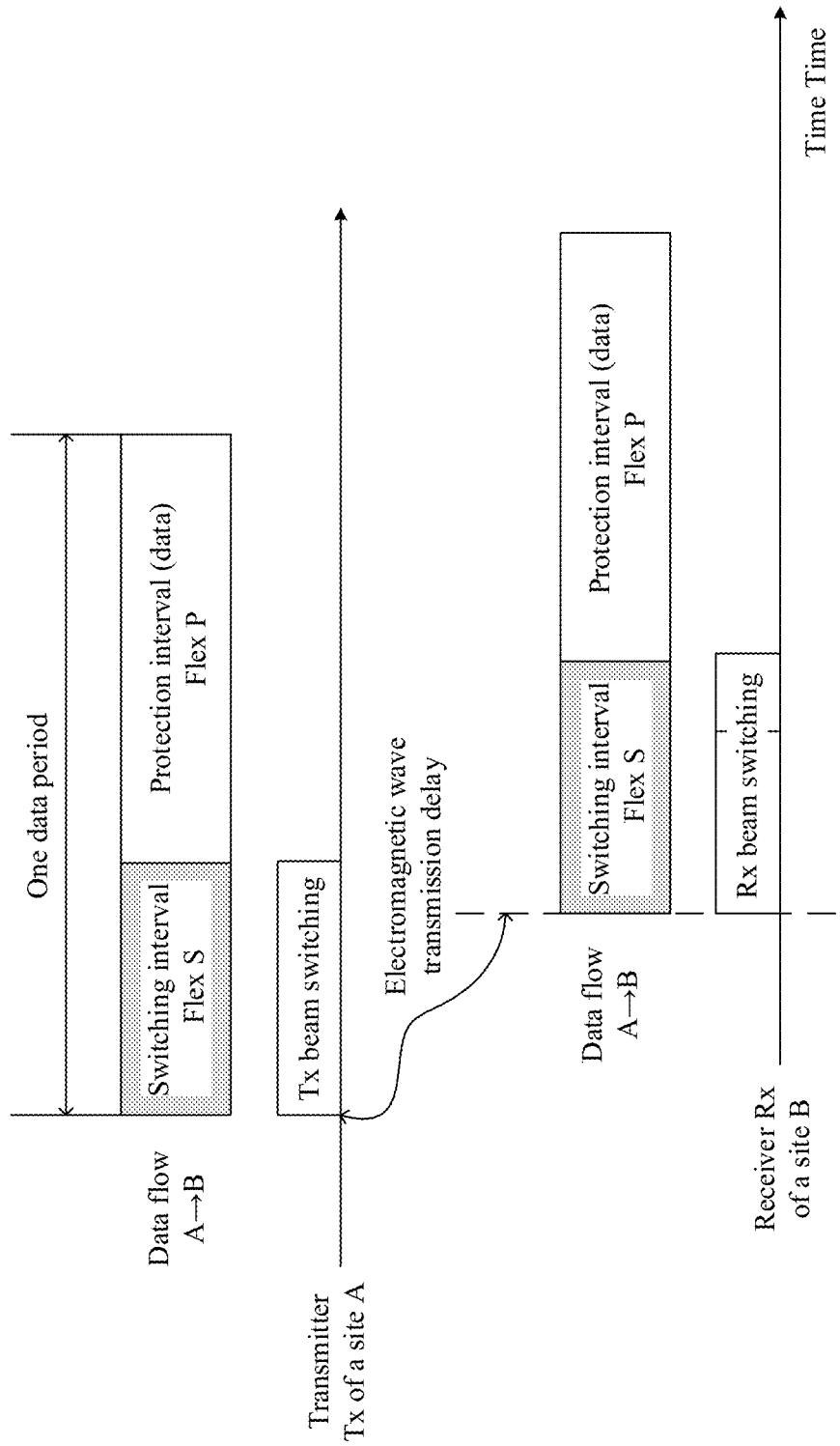
FIG. 6*c* is a schematic structural diagram of a unidirectional data flow in the second system configuration according to an embodiment of the present disclosure.

FIG. 6c is a schematic structural diagram of a unidirectional data flow in the second system configuration. In the data flow structure, in one link direction, the transmitter Tx of the site A performs beam adjustment in a switching interval in which the transmitter Tx sends a data flow, and the receiver Rx of the peer site B performs beam adjustment in a switching interval in which the receiver Rx receives the data flow, so that it is ensured that invalid switching overheads are the same as beam adjustment time overheads, and extra overheads caused by a transmission delay on a link are avoided.

The following describes the technical solutions of the present disclosure with reference to the foregoing data frame structure, the data filling principle, the receiver working principle, and the system synchronization principle.

Embodiment 1

This embodiment describes a case in which in a full-duplex mobile communications system, a base station and a transmit device and a receive device in a mobile station device share one beam-adjustable antenna feeder system to perform bidirectional communication. In this case, the entire system works in the first system configuration described above.

Specifically, the first system configuration includes a first network device and a second network device. In this embodiment, an example in which the first network device is a base station and the second network device is a terminal is used for description. The base station includes a beam control unit, a first transmit device, and a first receive device. Further, the beam control unit is configured to generate and send a beam adjustment request.

This embodiment is described on a basis that the first transmit device and the first receive device of the base station exchanges data in a generated data frame sequence.

When the beam control unit in the base station needs to adjust a device beam, the beam control unit generates a beam adjustment request, and sends the beam adjustment request to both the first transmit device and the first receive device. The beam adjustment request is used to instruct the first transmit device and the first receive device to perform beam adjustment.

Figure 7A:
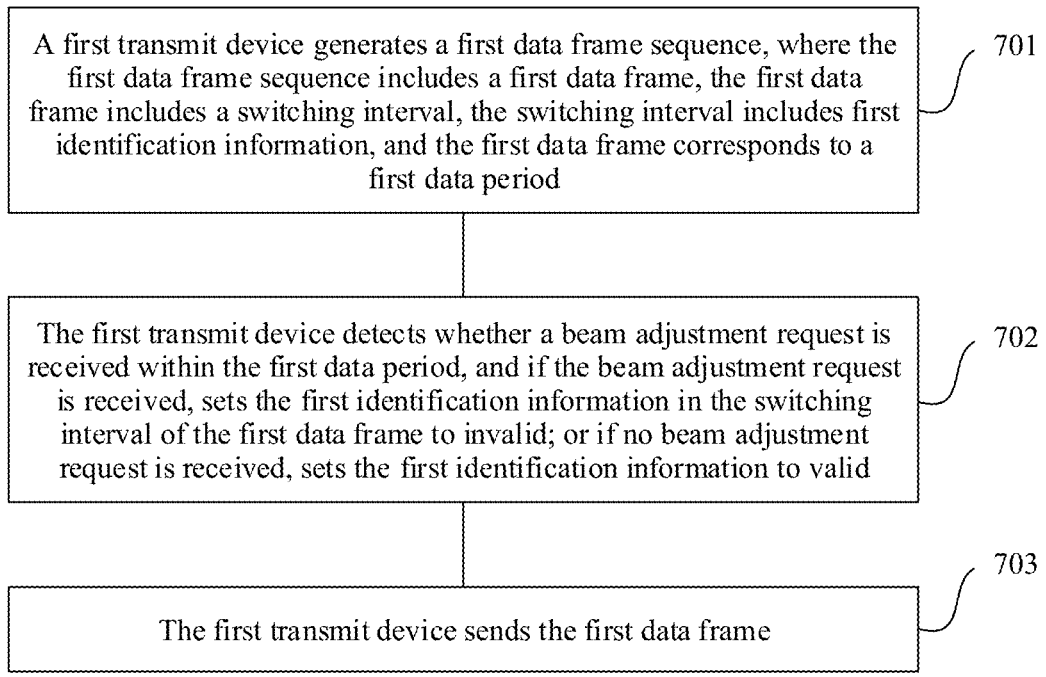
FIG. 7*a* is a schematic flowchart of a data transmission method applied to a transmit device according to an embodiment of the present disclosure.

Specifically, a procedure of a data transmission method is shown in FIG. 7a.

Operation 701: The first transmit device generates a first data frame sequence. The first data frame sequence includes a plurality of data frames having a same structure, and the data frames are sent to the peer second network device. For example, the first data frame sequence includes a first data frame, the first data frame includes a switching interval and a protection interval, the switching interval includes a first interval header and a first payload area, the first interval header includes first identification information, and the first identification information is used to indicate validity of data in the first payload area of the switching interval in which the first identification information is located. The first payload area is used to carry data, for example, valid data or invalid data. In addition, the first data frame corresponds to a first data period.

Operation 702: The first transmit device detects whether a beam adjustment request is received within the first data period, and if the beam adjustment request is received, sets the first identification information in the switching interval of the first data frame to invalid; or if no beam adjustment request is received, sets the first identification information to valid.

Specifically, in operation 702, when a switching interval of each data frame in a to-be-sent data frame sequence used arrives, the first transmit device detects whether the beam adjustment request from the beam control unit is received. If the beam adjustment request from the beam control unit is received, identification information in a switching interval (Flex S) of a data frame corresponding to a current data period is set to "invalid", and redundant invalid data is filled in the switching interval. In this case, the current switching interval includes invalid data and "invalid" identification information, then beam adjustment is performed in the switching interval, and the beam control unit is notified. If no beam adjustment request from the beam control unit is received, identification information in a current switching interval is set to "valid", and valid data is filled in the switching interval.

The identification information may indicate validity of the data in the interval in the binary mode. For example, 00 in binary indicates that the data is invalid, and 01 indicates that the data is valid. Alternatively, the identification information may indicate validity of the data in the interval by using a sequence string. For example, a correlation operation is performed on the sequence string; and if the sequence string is similar to a sequence string of the first identification information, it indicates that the data is valid; or if the sequence string is not similar to a sequence string of the first identification information, it indicates that the data is invalid. In addition, validity of the data in the switching interval may alternatively be indicated in another manner. This is not limited in the present disclosure.

Operation 703: The first transmit device sends the first data frame.

Specifically, the first transmit device sends, to a receiver of the second network device, the first data frame in which the first identification information is set; or the first transmit device sets the first data frame in the first data frame sequence, and a receiver of the second network device obtains a status of the first transmit device by receiving the first data frame in the first data frame sequence.

In addition, the first transmit device further stores the first identification information in the switching interval of the current first data frame.

In one embodiment, if it is detected during system synchronization that a transmission delay is greater than one data period of the currently used data frame, the first transmit device further stores identification information in a switching interval in a period exactly before the current data period. Similarly, if it is detected that a transmission delay is greater than two data periods, the first transmit device stores identification information in a switching interval in the second data period before the current data period. The rest can be deduced by analogy.

In a specific implementation of this embodiment, the first data frame further includes a protection interval, the protection interval includes a second interval header and a second payload area, and the second interval header includes second identification information, used to indicate validity of data in the second payload area of the first data frame. In one embodiment, the protection interval is located after the switching interval of the first data frame, and a length of the protection interval is greater than or equal to a length of the switching interval.

Before the first data frame is sent, the method further includes a operation of setting, by the first transmit device, validity of the second identification information in the first data frame.

Figure 7B:
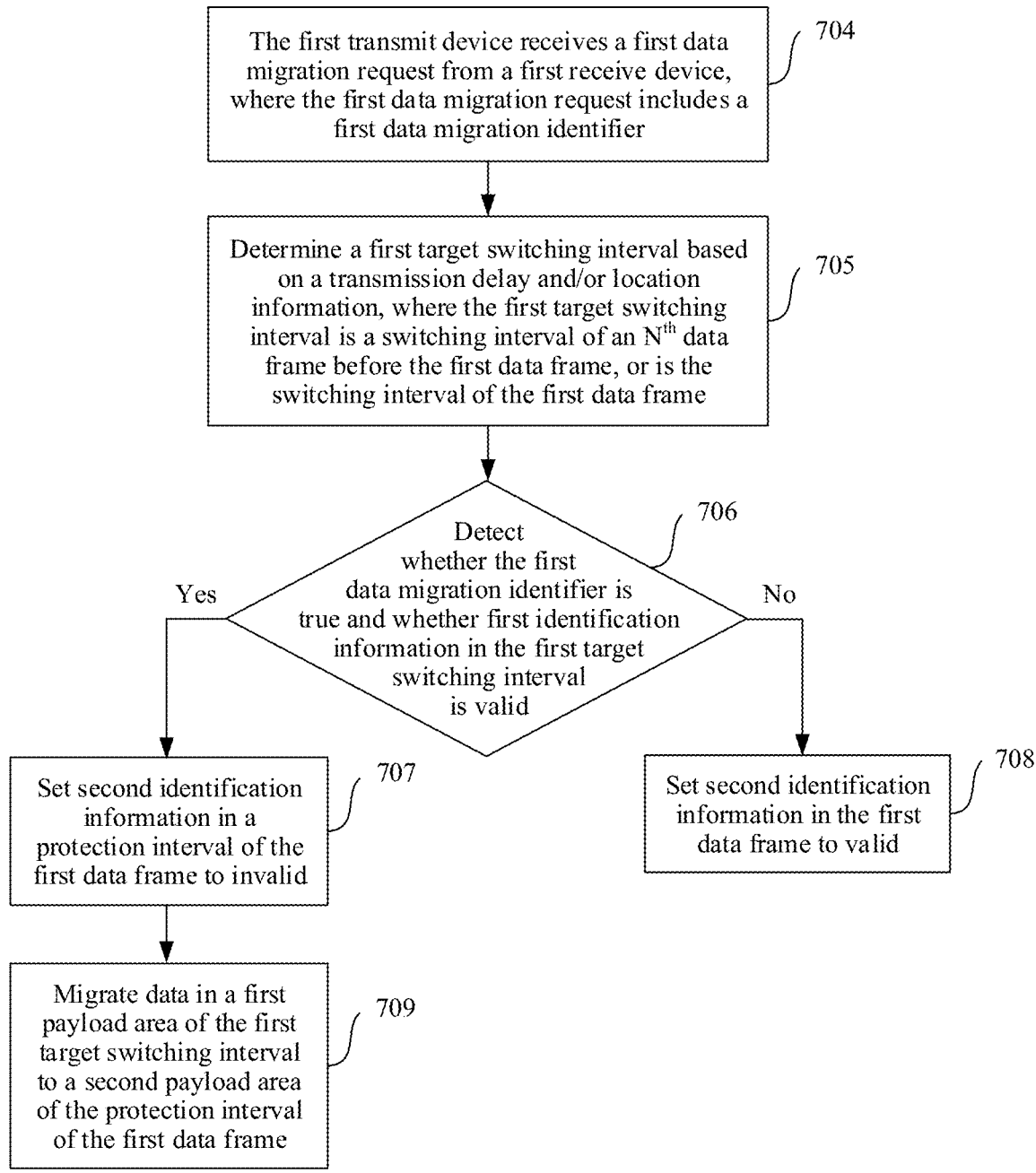
FIG. 7*b* is a schematic flowchart of another data transmission method applied to a transmit device according to an embodiment of the present disclosure.

Specifically, the operation is shown in FIG. 7b. Operation 704: The first transmit device receives a first data migration request from the first receive device, where the first data migration request includes a first data migration identifier.

Operation 705: Determine a first target switching interval based on a transmission delay and/or location information, where the first target switching interval is a switching interval of an $N^{th}$ data frame before the first data frame, or is the switching interval of the first data frame, where $N \geq 1$; the transmission delay is a time interval generated when data is transmitted from the first transmit device to a second receive device, or a time interval generated when data is transmitted from a second transmit device to the first receive device; and the location information includes a location number used to indicate a location of each data frame in the data frame sequence.

The first target switching interval may be the switching interval of the same data frame, or a switching interval of a historical data frame. Specifically, determining a target switching interval based on a transmission delay and/or location information includes the following operations.

First, the target switching interval is determined based on the transmission delay.

It is assumed that the transmission delay is $\Delta T$, when the receiver of the first network device receives invalid first identification information in the switching interval, it indicates that the transmitter of the second network device performs beam switching at a moment before $\Delta T$. It can be further inferred that in this case, the receiver of the second network device definitely discards data in the switching interval in the data frame sequence because of the beam switching, and further, the data in the switching interval is sent by the transmitter of the first network device to the second network device before a moment $2\Delta T$. Therefore, the first network device may determine the target switching interval based on $2\Delta T$.

Specifically, a ratio of $2\Delta T/T$ may be calculated, where T represents a data period. The calculated ratio is compared with a preset range to determine whether the target switching interval is a switching interval of the current data frame or a historical data frame, and the preset range may be set based on a system situation. For example, when the calculated ratio is less than 1, it may be determined that the switching interval of the currently detected data frame is used as the target switching interval; or when the ratio is between 1 and 2, a switching interval corresponding to the first data frame before the currently detected data frame may be used as the target switching interval.

Second, the target switching interval is determined based on the location information.

When it is difficult to determine the transmission delay or the transmission delay cannot be accurately obtained, the target switching interval may be determined based on the location information. Specifically, after the first network device and the second network device perform clock synchronization by using the GPS or the 1588 protocol, starting from a same moment, the first network device and the second network device perform cyclic numbering, for example, 0, 1, 2, 3, . . . , M, 0, 1, 2, . . . , and M, for switching intervals in transmit data flows. Numbers 0 to M are of one cycle period. The first network device calculates and stores a number difference D between the receiver and the transmitter in the switching interval. When the receiver of the first network device receives an invalid interval information identifier numbered X, an arithmetic formula (X−2D) mod M may be used to calculate a number N of the target switching interval.

If a transmission time of data frames in the cycle period and numbered from 0 to M is greater than twice the transmission delay, the first network device determines that a switching interval numbered N in the same cycle period is the target switching interval. If a transmission time of data frames is less than twice the transmission delay, the target switching interval needs to be determined based on the transmission delay and the location information.

Third, the target switching interval is determined based on the transmission delay and the location information.

After the number N of the target switching interval is calculated by using the second method, if a time interval between the target switching interval N and a current moment is less than twice the transmission delay, a switching interval corresponding to the number N in a cycle period exactly before the current cycle period may be selected as the target switching interval.

Operation 706: Detect whether the first data migration identifier is true and whether first identification information in the first target switching interval is valid.

Operation 707: If the first data migration identifier is true and the first identification information in the first target switching interval is valid, set the second identification information in the protection interval of the first data frame to invalid, and suspend filling of valid data in the protection interval; otherwise, set the second identification information in the first data frame is to valid (operation 708), and normally fill valid data.

One possible implementation is that, when the first data migration request does not include the first data migration identifier, the first transmit device may set the second identification information in the protection interval of the first data frame to invalid only when receiving the first data migration request from the first receive device and the first identification information corresponding to the first target switching interval is valid.

Further, the method further includes operation 709: When the second identification information in the first data frame is invalid, the first transmit device migrates data in a first payload area of the first target switching interval to the second payload area of the protection interval of the first data frame, where a length of the second payload area of the first data frame is greater than or equal to a length of the first payload area of the first target switching interval.

In operation 706, in addition to the case in which it is detected that the first data migration identifier is true and the first identification information is "valid", the following three cases are further included: The first data migration identifier is true and the first identification information is "invalid"; the first data migration identifier is false and the first identification information is "valid"; and the first data migration identifier is false and the first identification information is "invalid". In all of the three cases, the operation of setting the second identification information in the protection interval of the first data frame to valid and normally filling valid data is performed.

Figure 8A:
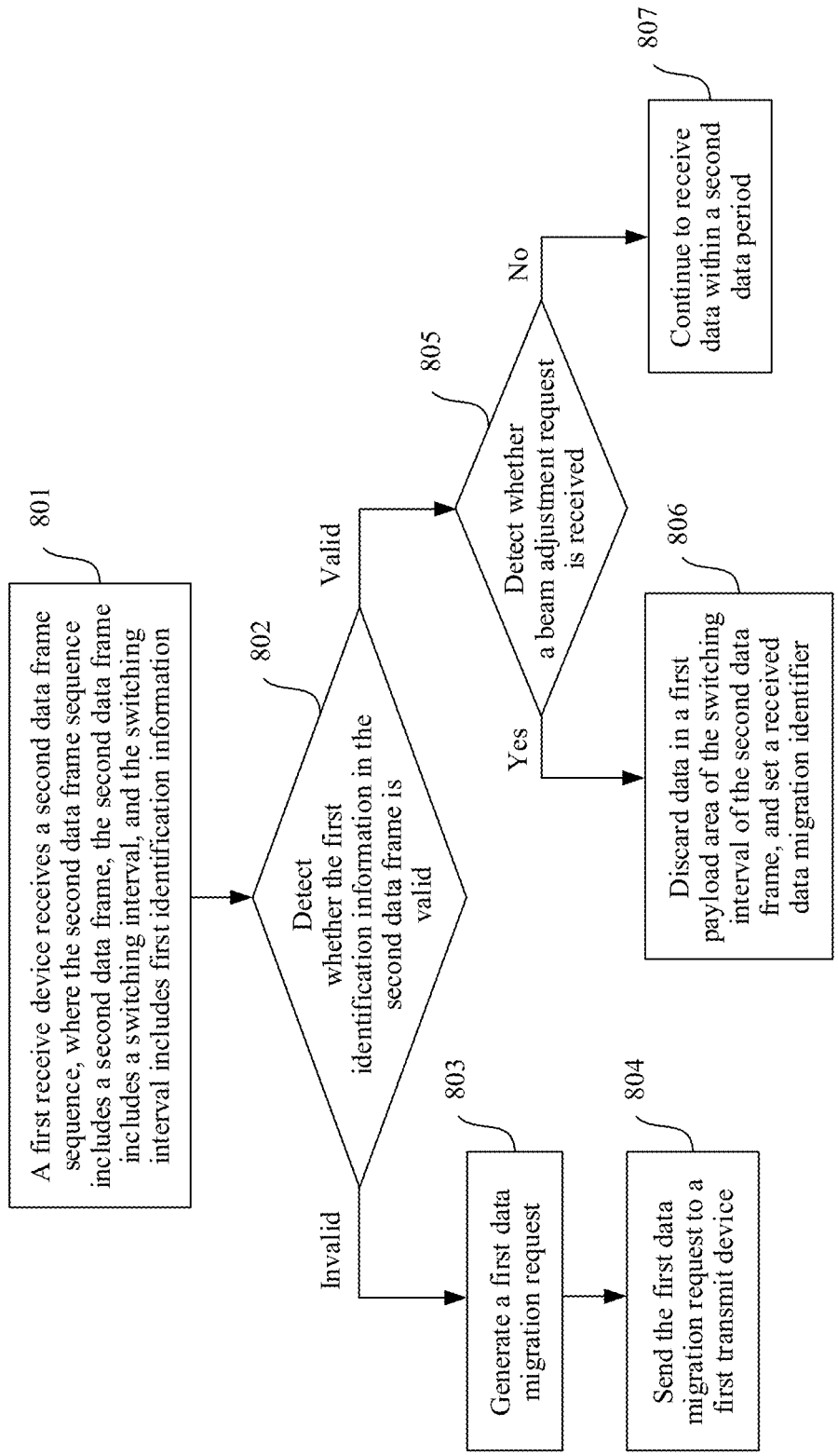
FIG. 8*a* is a schematic flowchart of a data transmission method applied to a receive device according to an embodiment of the present disclosure.

According to another aspect, this embodiment further provides a data transmission method, applied to the first receive device of the first network device. As shown in FIG. 8a, the method includes the following operations.

Operation 801: The first receive device receives a second data frame sequence, where the second data frame sequence includes a second data frame, the second data frame includes a switching interval, the switching interval includes first identification information, and the second data frame corresponds to a second data period.

The second data frame sequence may be generated and sent by the second network device at the peer end of the first network device. The second data frame sequence includes at least one data frame having a structure the same as that in the first data frame sequence. For example, the second data frame is included, the second data frame includes the switching interval and a protection interval, the switching interval includes the first identification information, and the protection interval includes second identification information.

Operation 802: The first receive device detects whether the first identification information in the second data frame is valid.

Operation 803: If the first identification information is invalid, generate a first data migration request. In one embodiment, the first data migration request carries a first data migration identifier, and the first data migration identifier is true. The first data migration request is the same as the data migration request received by the first transmit device in operation 704.

Operation 804: The first receive device sends the first data migration request to the first transmit device.

The method further includes operation 805: If the first receive device detects that the first identification information in the second data frame is valid, the first receive device detects, within a second data period corresponding to the second data frame, whether a beam adjustment request is received.

Operation 806: If the beam adjustment request is received, discard data in a first payload area of the switching interval of the second data frame, and set a received data migration identifier in the switching interval of the second data frame, where the received data migration identifier is used to indicate migrated data that needs to be received.

Operation 807: If no beam adjustment request is received, continue to receive data in a first payload area of the switching interval of the second data frame within the second data period.

Figure 8B:
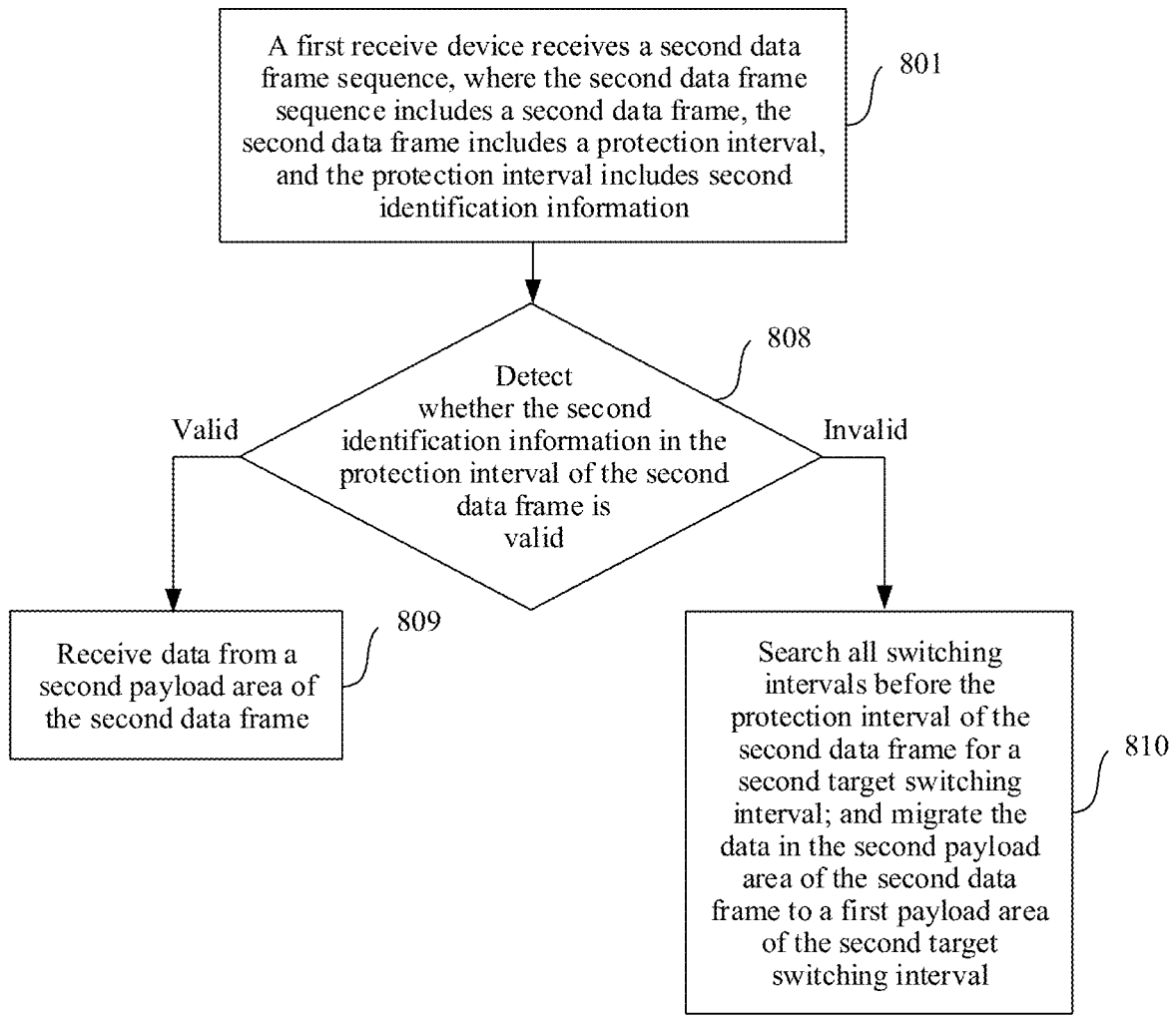
FIG. 8*b* is a schematic flowchart of another data transmission method applied to a receive device according to an embodiment of the present disclosure.

In this embodiment, the second data frame further includes the protection interval, the protection interval includes a second interval header and a second payload area, and the second identification information is set in the second interval header and is used to indicate validity of data in the second payload area of the protection interval in which the second identification information is located. The method further includes: setting validity of the second identification information. Specifically, as shown in FIG. 8b, the method includes the following operations.

Operation 808: The first receive device detects whether the second identification information in the protection interval of the second data frame is valid.

Operation 809: If the second identification information is valid, receive the data in the second payload area of the second data frame.

Operation 810: If the second identification information is invalid, search all switching intervals before the protection interval of the second data frame for a second target switching interval, where the second target switching interval is a switching interval that has the received data migration identifier and is closest to the protection interval of the second data frame in terms of time; and migrate the data in the second payload area of the second data frame to a first payload area of the second target switching interval. In each data frame, a switching interval is located before a protection interval.

To be specific, in the process of determining the second target switching interval, switching intervals having received data migration identifiers in previously recorded historical data frames are first searched for, and then a switching interval closest to the protection interval of the current data frame is determined as the second target switching interval.

According to the data transmission method provided in this embodiment, because data frame sequences on the bidirectional communication link in the first system configuration has a synchronization feature, and beam adjustment affects the link in both transmit and receive directions, the transmit device configures the first identification information in the sent data frame, and the first identification information also carries information about whether the local receiver of the transmit device effectively receives the data of the switching interval at the moment, so that the local transmit device and the local receive device are prevented from separately sending a request to the peer network device, thereby reducing a transmission delay and improving switching efficiency.

Specifically, the local first transmit device sets the first identification information in the switching interval to "invalid" during the beam adjustment. After receiving the "invalid" identification information, the local first receive device learns that the peer second transmit device performs beam adjustment in the switching interval. Therefore, it can be inferred that the peer second receive device also discards data in a switching interval in a receive data flow due to the beam adjustment. Therefore, the local device may check validity of identification information in a switching interval recorded in a historical data frame sequence of the local end device, to determine whether the data in the switching interval that is discarded by the peer second receive device includes valid data, to determine whether the data in the switching interval that is discarded during the beam adjustment needs to be migrated to a protection interval of a next data frame.

In this embodiment, a special data frame structure that carries identification information is used to transfer statuses of both ends, so that devices at the both ends can independently learn of a data flow status of the peer device, and perform an automatic data migration action in a timely and reliable manner, thereby shortening a response delay of data interaction, and improving data transmission reliability and timeliness.

It should be noted that in the technical solution of this embodiment, the local base station side is used as an example. Because operations of a method performed by the second transmit device and the second receive device on the peer terminal side are the same as those performed by the first transmit device and the first receive device on the local end, details are not described.

Embodiment 2

This embodiment may be applied to a point-to-point microwave backhaul system. Two sites may perform bidirectional communication in a multi-frequency point and multi-mode combination communication manner, and use transmit and receive antennas that are separated from each other to improve isolation. Each of the transmit and receive antennas has a beam adjustment function, to prevent a tower or pole from shaking during communication.

In the system, data flow structures on a bidirectional link do not need to be synchronized, and a transmit antenna and a receive antenna in a device of one site separately synchronize with a to-be-sent data frame sequence and a to-be-received data frame sequence, and then perform independent beam switching. In this case, the entire system works in a state as the second system configuration shown in FIG. 5.

The second system configuration includes at least two network devices, for example, a first network device and a second network device. Each network device may include a transmit device (a transmitter) and a receive device (a receiver). In addition, data transmitted by the transmitter of the first network device to the receiver of the second network device may be represented by a data frame sequence, and data transmitted by the transmitter of the second network device to the receiver of the first network device may be represented by another data frame sequence. The two data frame sequences are not necessarily related to each other and may be independent of each other.

Figure 9:
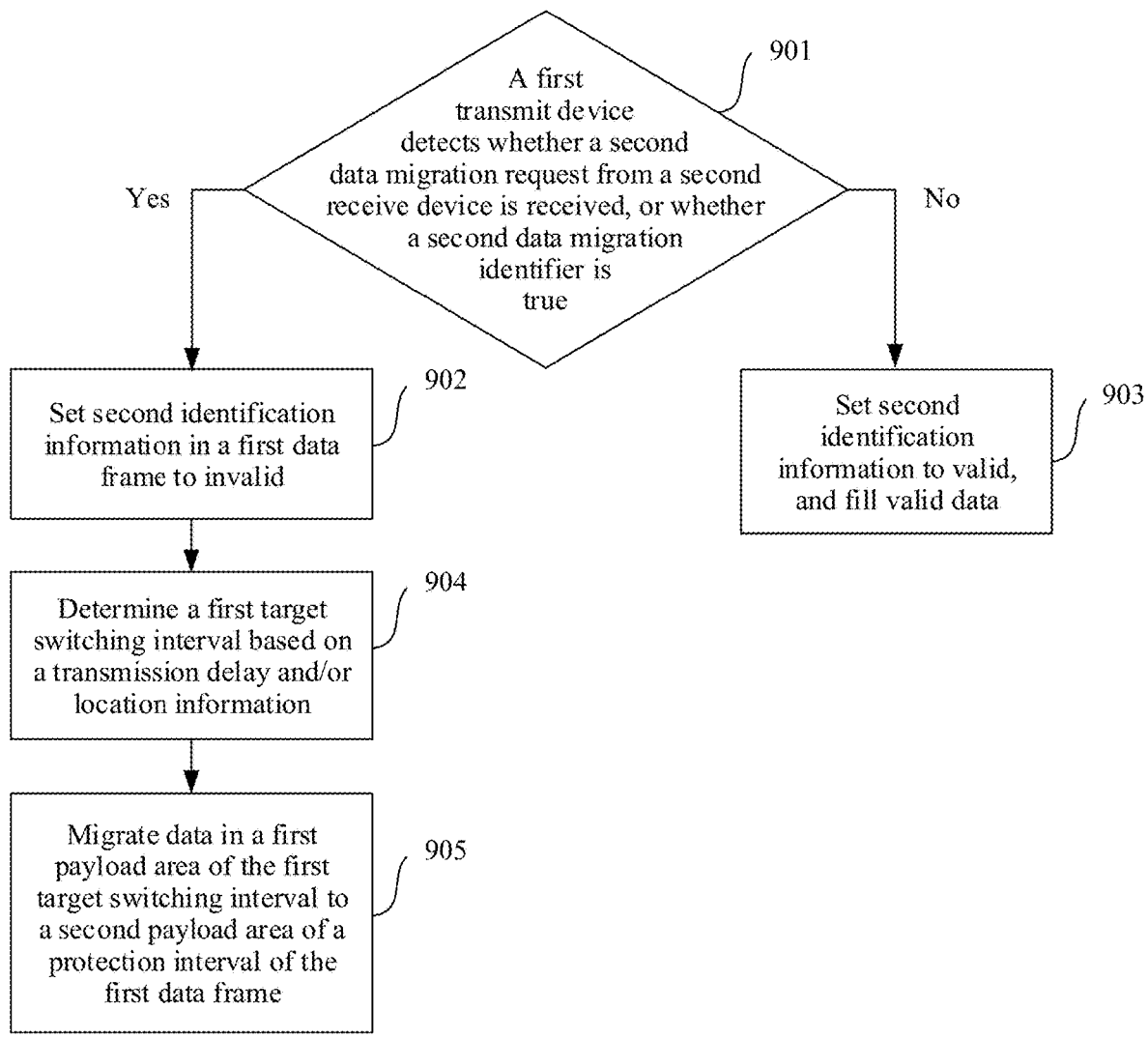
FIG. 9 is a schematic flowchart of still another data transmission method applied to a transmit device according to an embodiment of the present disclosure.

In this embodiment, an example in which the transmitter of the first network device sends data to the receiver of the second network device is used. In a data transmission process, a working procedure of the data transmission process of the first network device is shown in FIG. 9.

When a beam control unit of the first network device needs to perform device beam adjustment, the beam control unit sends a beam adjustment request to the first transmit device, and sends a notification to the second receive device of the second network device, to instruct the second receive device to receive the beam adjustment request.

The method specifically includes: generating, by the first transmit device, a first data frame sequence, where the first data frame sequence includes a first data frame, the first data frame includes a switching interval, first identification information is set in the switching interval, and the first data frame corresponds to a first data period; detecting, by the first transmit device, whether a beam adjustment request is received within the first data period, and if the beam adjustment request is received, setting the first identification information in the switching interval of the first data frame to invalid; or if no beam adjustment request is received, setting the first identification information to valid; and sending, by the first transmit device, the first data frame. This operation is the same as operation 701 to operation 703 in the foregoing embodiment, refer to the foregoing descriptions. Details are not described again.

A difference between Embodiment 1 and Embodiment 2 lies in a process of setting validity of second identification information in the first data frame. The process specifically includes the following operations.

As shown in FIG. 9, operation 901: The first transmit device detects whether a second data migration request from the second receive device is received; or whether a second data migration request is received, and whether a second data migration identifier carried in the second data migration request is true.

Operation 902: If the second data migration request is received; or the second data migration request is received and the second data migration identifier is true, set the second identification information in the first data frame to invalid.

Operation 903: If no second data migration request is received, set the second identification information to valid, and fill valid data in a payload area of a protection interval.

The method further includes the following operations.

Operation 904: When the second identification information in the first data frame is invalid, the first transmit device determines a first target switching interval based on a transmission delay and/or location information, where the first target switching interval is a switching interval of an $N^{th}$ data frame before the first data frame, or the switching interval of the first data frame, where N≥1 and N is a positive integer.

The transmission delay includes a time interval generated when data is transmitted from the first transmit device to the second receive device, or a time interval generated when data is transmitted from the second transmit device to the first receive device. The location information is used to indicate a location number of a data frame that needs to be migrated, and a location number of each data frame in the transmitted data frame sequence may be generated through preconfiguration.

Further, in this embodiment, in a non-duplex mode, the method for determining the target switching interval based on the transmission delay and/or the location information is similar to that in Embodiment 1, but a difference lies in that a fixed delay time P needs to be added and P is less than one data period.

The delay time P may be calculated by the receive device at a moment at which the receive device detects that beam switching needs to be performed. Because the receive device needs to send a feedback message to the peer transmit device during the beam adjustment, to notify the peer transmit device of a current status of the receive device. Usually, the feedback message is configured at a frame header of a data frame. When receiving the data frame, the frame header of the data frame has been passed when the receive device sends the feedback message. Therefore, it takes a period of time to read the current data frame and then configure the feedback message in a frame header of a next data frame, and a time for reading a remaining part of the current data frame is set as the fixed delay P that needs to be added.

A specific method for determining the target switching interval includes:

If a transmission delay $\Delta T$ is obtained, after the beam adjustment, the second network device sends a data migration request after the fixed delay time P. After receiving the data migration request, the first network device determines the target switching interval based on $P+2\Delta T$. Specifically, for example, a ratio of $(P+2\Delta T)/T$ is calculated, and the target switching interval is determined based on the ratio and a preset value. For a comparison result, refer to the process of determining the target switching interval based on the transmission delay in Embodiment 1. Details are not described again.

If it is difficult to obtain the transmission delay, the target switching interval may be determined by using the location information. Specifically, the first network device and the second network device separately perform cyclic numbering, for example, 0, 1, 2, 3, . . . , M, 0, 1, 2, . . . , for switching intervals in transmit data flows. Numbers 0 to M are of one cycle period. After switching a beam and discarding data in a switching interval, the receiver of the second network device sends, together with a data migration request, a number corresponding to the switching interval in which the data is discarded, to the first network device after the fixed delay time P.

When duration of data frames in the cycle period and numbered from 0 to M is greater than $P+2\Delta T$, the first network device determines that a switching interval numbered N in the same cycle period is the target switching interval, where N is a calculated number of the target switching interval; or when duration of data frames in the cycle period and numbered from 0 to M is less than $P+2\Delta T$, a switching interval corresponding to the number N in a cycle period before the current cycle period may be selected as the target switching interval.

Operation 905: Migrate data in a first payload area of the first target switching interval to the second payload area of the protection interval of the first data frame, where a length of the second payload area of the first data frame is greater than or equal to a length of the first payload area of the first target switching interval, so that all data in the target switching interval can be migrated to the protection interval.

A process in which the second receive device of the second network device generates and sends a second data migration request includes the following operations.

Operation 1001: The second receive device receives a first data frame sequence, where the first data frame sequence includes a first data frame, the first data frame includes a switching interval, and first identification information is set in the switching interval.

Operation 1002: Detect whether the first identification information in the switching interval of the first data frame is valid.

Operation 1003: If the first identification information is valid, detect whether a beam adjustment request is received within a first data period corresponding to the first data frame, and if the beam adjustment request is received, generate the second data migration request.

In one embodiment, the generating the second data migration request includes: generating a second data migration identifier whose content is true and the second data migration request.

Operation 1004: The second receive device sends the second data migration request to the first transmit device.

In one embodiment, the sending, by the second receive device, the second data migration request to the first transmit device includes: sending, by the second receive device, the second data migration identifier whose content is true to the first transmit device by using the second data migration request.

In addition, the first data frame further includes a protection interval, where the protection interval includes a second interval header and a second payload area, and second identification information is set in the second interval header and is used to indicate validity of data in the second payload area of the first data frame. The method further includes:

detecting, by the second receive device, whether the second identification information in the first data frame is valid; and if the second identification information is valid, continuing to receive the data in the second payload area of the first data frame; or if the second identification information is invalid, searching all switching intervals before the protection interval of the first data frame for a first target switching interval, where the first target switching interval is a switching interval that has a received data migration identifier and is closest to the protection interval of the second data frame in terms of time; and migrating the data in the second payload area of the second data frame to a first payload area of the second target switching interval.

Specifically, a condition for determining the first target switching interval is: a switching interval on which the received data migration identifier is attached and that is closest to the protection interval of the first data frame in terms of time. During detection, starting from a switching interval of the first data frame that is closest to the protection interval of the first data frame, if the switching interval of the first data frame does not satisfy the condition of the target switching interval, whether a switching interval of the first data frame before the first data frame includes the received data migration identifier is detected, and if the received data migration identifier is included, the switching interval of the first data frame before the first data frame is determined as the first target switching interval; or if the received data migration identifier is not included, whether the second data frame before the first data frame satisfies the condition is determined. The rest can be deduced by analogy.

In one embodiment, when the received data migration identifier is true, it may be alternatively detected that a switching interval that is closest to the protection interval of the detected data frame is the target switching interval.

In one embodiment, in the process in which the first network device and the second network device transmit data in this embodiment, if a density of data migration requests fed back by the network device at one end increases, to be specific, if continuous data migration needs to be performed, the method further includes:

If the receive device of the second network device receives the beam adjustment request within a data period corresponding to a plurality of consecutive data frames after the current first data frame is received, a start instruction is generated, where the start instruction is used to instruct the transmit device of the first network device to perform a continuous data migration operation; and the start instruction is sent to the first network device.

Correspondingly, after receiving the start instruction from the second network device, the first network device migrates, to-be-migrated data to a second payload area of a protection interval corresponding to each data frame, starting from migrating the data in the first payload area of the first target switching interval to the second payload area of the first data frame.

If the receive device of the second network device receives no beam adjustment request within a data period corresponding to a plurality of consecutive data frames after the start instruction is generated, a stop instruction is generated, where the stop instruction is used to instruct the transmit device of the first network device to stop the continuous data migration operation; and the stop instruction is sent to the first transmit device.

Correspondingly, after receiving the stop instruction, the first network device stops data migration starting from a next data frame.

According to the method provided in this embodiment, data flow structures on the bidirectional communication link in the second system configuration are asynchronous, and beam adjustment does not affect the bidirectional link in both transmit and receive directions. Therefore, in a normal working mode, in a sent data frame sequence, setting of validity of identification information in a switching interval of a data frame may be determined based on a requirement of a beam adjustment request. When the receive device adjusts a receive beam, if the identification information in the switching interval of the data frame is "valid" communication data, the receive device needs to instruct the transmit device to first migrate lost data to a corresponding protection interval, and then send the migrated data to the transmit device again, so that the receive device is prevented from losing important data in a data adjustment process.

According to the method provided in this embodiment, when a local network device continuously discards data in a switching interval due to continuous shake, a started continuous migration working mode may instruct a peer network device to suspend filling of valid data in the switching interval, to reserve a sufficient time for beam adjustment of a local receive device. In this way, overheads generated when the local receive device continuously feeds back data migration requests to the peer end are avoided, transmission resources are saved, and transmission efficiency is improved.

According to the methods provided in the foregoing Embodiment 1 and Embodiment 2 of the present disclosure, each data frame in a data frame sequence is divided into dynamic functional intervals, for example, a switching interval and a protection interval, and a data load adjustment method is used to achieve an optimal balance between beam adjustment performance and data transmission efficiency, to ensure that a switching interval is inserted at a high frequency, thereby improving beam adjustment frequency, and satisfying a beam adjustment speed under a limit requirement. In a static working environment, it can further be ensured that resources of a dynamic interval are fully used, thereby improving data transmission efficiency.

In the first system configuration, no instruction or notification needs to be fed back for starting of and responding to data migration, thereby achieving beneficial effects of a small response delay and high reliability. In the second system configuration, normal data migration needs to be performed based on only sparse feedback notifications. When a density of feedback instructions increases, a site adaptively switches to a special working mode to perform continuous data migration without needing any feedback from a peer end, thereby avoiding timeliness of beam switching of a receiver caused by a feedback delay.

Figure 11:
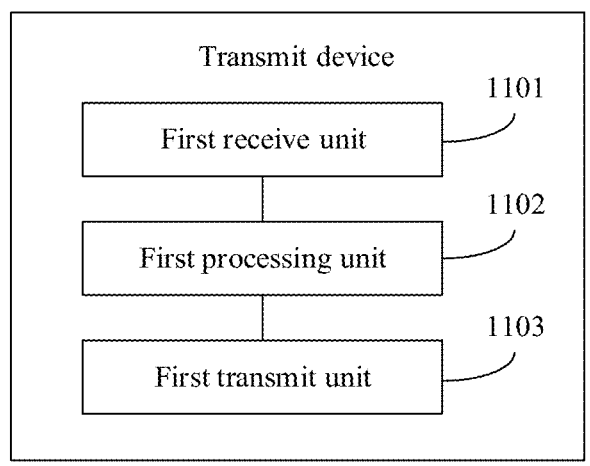
FIG. 11 is a schematic structural diagram of a transmit device according to an embodiment of the present disclosure.

Corresponding to the foregoing method embodiment, the present disclosure further provides a transmit device or a transmitter, configured to implement the data transmission methods in FIG. 7a and FIG. 7b, and FIG. 9. Details are shown in FIG. 11. The transmit device includes a first receive unit 1101, a first processing unit 1102, and a first transmit unit 1103. In addition, the transmit device may further include another functional unit such as a storage unit.

Further, the first processing unit 1102 is configured to: generate a data frame sequence, where the data frame sequence includes a first data frame, the first data frame includes a switching interval, the switching interval includes first identification information, and the first data frame corresponds to a first data period; and detect whether a beam adjustment request is received within the first data period, and if the beam adjustment request is received, set the first identification information in the switching interval of the first data frame to invalid; or if no beam adjustment request is received, set the first identification information to valid. The first transmit unit 1103 is configured to send the first data frame.

In one embodiment, in a specific implementation of this embodiment, the switching interval includes a first interval header and a first payload area, and, and the first interval header includes the first identification information.

The first processing unit 1102 is further configured to: after receiving the beam adjustment request within the first data period, fill invalid data in the first payload area of the switching interval of the first data frame, and perform beam adjustment within the first data period; or when receiving no beam adjustment request within the first data period, fill valid data in the first payload area of the switching interval of the first data frame.

In one embodiment, in another specific implementation of this embodiment, the first data frame further includes a protection interval, the protection interval includes a second interval header and a second payload area, and the second interval header includes second identification information.

The first processing unit 1102 is further configured to set validity of the second identification information in the second interval header of the first data frame.

In one embodiment, in another specific implementation of this embodiment, the first processing unit 1102 is specifically configured to: determine a first target switching interval based on a transmission delay and/or location information; and if it is detected that the first receive unit receives a first data migration request from the first receive device, and first identification information in the first target switching interval is valid, set the second identification information in the protection interval of the first data frame to invalid; otherwise, set the second identification information to valid, where the first target switching interval is a switching interval of an $N^{th}$ data frame before the first data frame, or is the switching interval of the first data frame, where $N \geq 1$; or the first processing unit 1102 is specifically configured to: determine a first target switching interval based on a transmission delay and/or location information; and if a first data migration identifier in a first data migration request received by the first receive unit from the first receive device is true, and first identification information in the first target switching interval is valid, set the second identification information in the protection interval of the first data frame to invalid; otherwise, set the second identification information to valid.

The transmission delay is a time interval generated when data is transmitted from the first transmit device to a second receive device, or a time interval generated when data is transmitted from a second transmit device to the first receive device. The location information includes a location number used to indicate a location of each data frame in the data frame sequence.

Further, the first processing unit 1102 is further configured to: when the second identification information in the first data frame is invalid, migrate data in a first payload area of the first target switching interval to the second payload area of the protection interval of the first data frame, where a length of the second payload area of the first data frame is greater than or equal to a length of the first payload area of the first target switching interval.

In one embodiment, in another specific implementation of this embodiment, when the first receive unit 1101 receives a second data migration request from the second receive device, the first processing unit 1102 sets the second identification information in the first data frame to invalid; otherwise, set the second identification information to valid; or when a second data migration request is received by using the first receive unit, and a second data migration identifier carried in the second data migration request is true, set the second identification information in the first data frame to invalid; otherwise, set the second identification information to to valid.

In one embodiment, in another specific implementation of this embodiment, the first processing unit 1102 is further specifically configured to: when the second identification information in the first data frame is invalid, determine a first target switching interval based on a transmission delay and/or location information, where the first target switching interval is a switching interval of an $N^{th}$ data frame before the first data frame, or is the switching interval of the first data frame, where $N \geq 1$; and migrate data in a first payload area of the first target switching interval to the second payload area of the protection interval of the first data frame, where a length of the second payload area of the first data frame is greater than or equal to a length of the first payload area of the first target switching interval.

In one embodiment, in another specific implementation of this embodiment, the first receive unit 1101 is further configured to receive a start instruction and a stop instruction; and the first processing unit 1102 is specifically configured to: when the start instruction is received, migrate, to-be-migrated data to a second payload area of a protection interval corresponding to each data frame, starting from migrating the data in the first payload area of the first target switching interval to the second payload area of the first data frame; and when receiving the stop instruction, stop data migration starting from a next data frame.

In this embodiment, the transmit device generates the data frame or the data frame sequence that carries the identification information, and sets validity of the first identification information based on a status of receiving the beam adjustment request, so that when receiving the data frame, the receive device can determine, based on the validity of the first identification information in the data frame, whether the transmit device is performing beam adjustment, and perform a corresponding feedback action based on a status of the transmit device. Therefore, the transmit device is prevented from separately sending a request to the receive device during the beam adjustment, and a transmission delay in an interaction process of sending the request is avoided, thereby improving beam switching efficiency.

Figure 10:
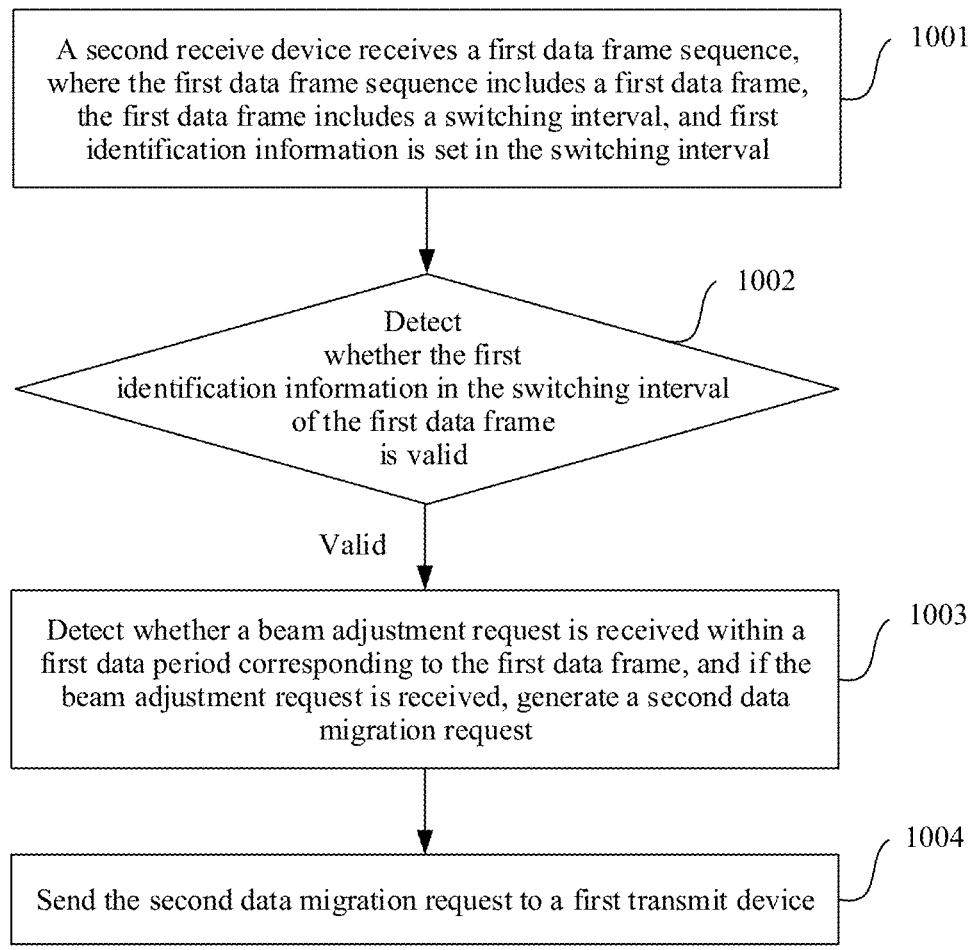
FIG. 10 is a schematic flowchart of still another data transmission method applied to a receive device according to an embodiment of the present disclosure.
Figure 12:
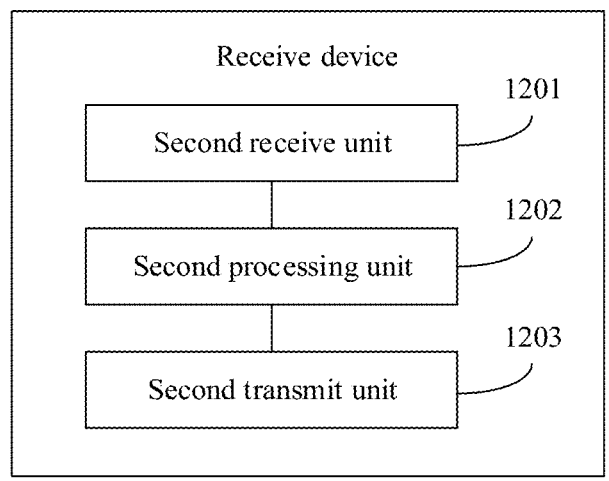
FIG. 12 is a schematic structural diagram of a receive device according to an embodiment of the present disclosure.

Corresponding to the foregoing method embodiment, the present disclosure further provides a receive device or a transmitter, configured to implement the data transmission methods in FIG. 8a, FIG. 8b, and FIG. 10. Specifically, as shown in FIG. 12, using a receive device of a first network device as an example, the receive device includes a second receive unit 1201, a second processing unit 1202, and a second transmit unit 1203. In addition, the receive device may further include another functional unit such as a storage unit.

The second receive unit 1201 is configured to receive a second data frame sequence, where the second data frame sequence includes a second data frame, the second data frame includes a switching interval, the switching interval includes a second interval header, and the second interval header includes second identification information, used to indicate validity of data in the switching interval.

The second processing unit 1202 is configured to: detect whether the second identification information in the switching interval of the second data frame is valid, and if the second identification information is invalid, generate a first data migration request.

The second transmit unit 1203 is configured to send the first data migration request.

In one embodiment, in a specific implementation of this embodiment, the second processing unit 1202 is further configured to: if the first identification information in the second data frame is valid, detect, within a second data period corresponding to the second data frame, whether a beam adjustment request is received; and if the beam adjustment request is received, discard data in a first payload area of the switching interval of the second data frame, and set a received data migration identifier in the switching interval of the second data frame; or if no beam adjustment request is received, continue to receive data within the second data period.

In one embodiment, in a specific implementation of this embodiment, the second data frame further includes a protection interval, the protection interval includes a second interval header and a second payload area, and second identification information is set in the second interval header and is used to indicate validity of data in the second payload area of the protection interval in which the second identification information is located.

The second processing unit 1202 is further configured to: detect whether the second identification information in the protection interval of the second data frame is valid; and if the second identification information is valid, receive the data in the second payload area of the second data frame by using the second receive unit; or if the second identification information is invalid, search all switching intervals before the protection interval of the second data frame for a second target switching interval, where the second target switching interval is a switching interval that has the received data migration identifier and is closest to the protection interval of the second data frame in terms of time; and migrate the data in the second payload area of the second data frame to a first payload area of the second target switching interval.

When the receive device is a peer second network device, to be specific, a second receive device of the second network device, the second receive device includes a third receive unit, a third processing unit, and a third transmit unit.

The third receive unit is configured to receive a first data frame sequence, where the first data frame sequence includes a first data frame, the first data frame includes a switching interval, and first identification information is set in the switching interval.

The third processing unit is configured to: detect whether the first identification information in the switching interval of the first data frame is valid; if the first identification information is valid, detect whether a beam adjustment request is received within a first data period corresponding to the first data frame; and if the beam adjustment request is received, generate a second data migration request, discard data in a first payload area of the switching interval of the first data frame, and set a received data migration identifier in the switching interval of the first data frame.

The third transmit unit is configured to send the second data migration request to a first transmit device.

In one embodiment, in a specific implementation, the third processing unit is specifically configured to generate a second data migration identifier whose content is true and the second data migration request. The third transmit unit is specifically configured to send the second data migration identifier whose content is true to the first transmit device by using the second data migration request.

In addition, the third processing unit is further configured to: detect whether the second identification information in the first data frame is valid; and if the second identification information is valid, continue to receive the data in the second payload area of the first data frame by using the third receive unit; or if the second identification information is invalid, searching all switching intervals before the protection interval of the first data frame for a first target switching interval, where the first target switching interval is a switching interval that has the received data migration identifier and is closest to the protection interval of the first data frame in terms of time; and migrate the data in the second payload area of the protection interval of the first data frame to a first payload area of the first target switching interval.

In one embodiment, in a specific implementation, the third processing unit is further configured to: if the beam adjustment request is received within a data period corresponding to at least one consecutive data frame after the first data frame is received, generate a start instruction, where the start instruction is used to instruct the first transmit device to perform a continuous data migration operation.

The third transmit unit is further configured to send the start instruction to the first transmit device.

The third processing unit is further configured to: if no beam adjustment request is received within a data period corresponding to at least one consecutive data frame after the start instruction is generated, generate a stop instruction, where the stop instruction is used to instruct the first transmit device to stop the continuous data migration operation.

The third transmit unit is further configured to send the stop instruction to the first transmit device.

Figure 13:
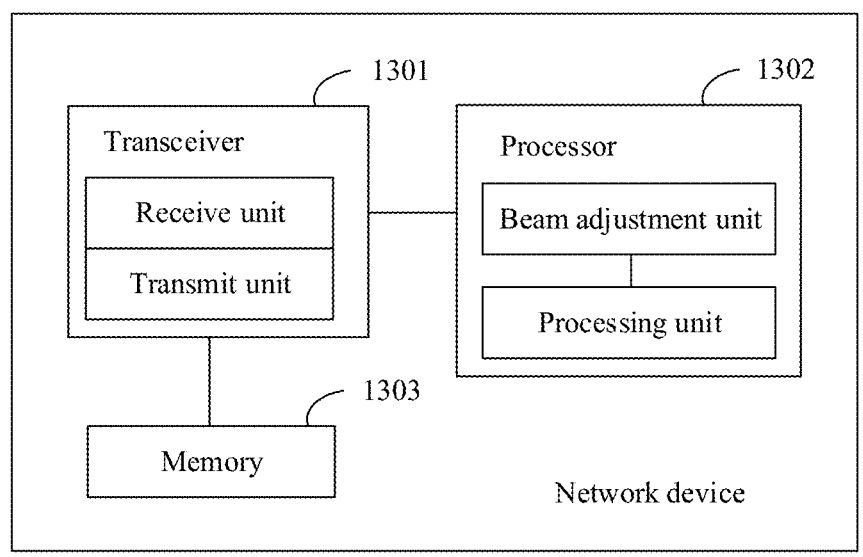
FIG. 13 is a schematic structural diagram of a network device according to an embodiment of the present disclosure.

FIG. 13 is a schematic structural diagram of a network device according to an embodiment of the present disclosure. The network device is configured to perform the data transmission method according to the foregoing embodiment. The network device may include a transceiver 1301, a processor 1302, and a memory 1303. The network device may alternatively include more or fewer components, or combine some components, or have different component arrangements. This is not limited in the present disclosure.

The transceiver 1301 includes a receive unit and a transmit unit, configured to implement communication transmission between different network devices, for example, sending and receiving data, signaling, or a request message. Further, the transceiver 1301 may include communications modules such as a wireless local area network (WLAN) module, a Bluetooth module, and a baseband module, and radio frequency (RF) circuits corresponding to the communications modules, to perform communication in a wireless local area network, Bluetooth communication, infrared communication, and/or communication in a cellular communications system, for example, wideband code division multiple access (WCDMA) and/or high speed downlink packet access (HSDPA). The transceiver is configured to control communication between all the components in the network device, and may support direct memory access.

The processor 1302 is a control center of the network device, and is connected to various parts of the entire network device by using various interfaces and lines. The processor 1302 runs or executes a software program and/or a module stored in the memory 1303, and invokes data stored in the memory 1303, to perform various functions of the network device and/or process data.

Further, the processor 1302 may include an integrated circuit (IC), for example, may include a single packaged IC, or may include a plurality of connected packaged ICs with a same function or different functions. For example, the processor 1302 may include only a central processing unit (CPU), or may be a combination of a GPU, a digital signal processor (DSP), and a control chip (for example, a baseband chip) in a transceiver module. In various implementations of the present disclosure, the CPU may be a single computing core, or may include a plurality of computing cores.

In one embodiment, the processor 1302 includes a beam adjustment unit and a processing unit. The beam adjustment unit is configured to generate a beam adjustment request. The processing unit is configured to: generate a data frame, set validity of identification information in a protection interval and a switching interval of the data frame, generate a data migration request, and the like.

The memory 1303 may include a volatile memory, such as a random access memory (RAM); or may include a non-volatile memory, such as a flash memory, a hard disk drive (HDD), or a solid-state drive (SSD). The memory may alternatively include a combination of the foregoing types of memories. The memory may store a program or code. The processor 142 in the network device executes the program or the code to implement functions of the network device.

In the foregoing embodiment, functions to be implemented by the first receive unit 1101 and the first transmit unit 1103 shown in FIG. 11 and the second receive unit 1201 and the second transmit unit 1203 shown in FIG. 12 may be implemented by the transceiver 1301 of the network device, or may be implemented by the transceiver 1301 controlled by the processor 1302. Functions to be implemented by the first processing unit 1102 and the second processing unit 1202 may be implemented by the processor 1302. The memory 1303 is configured to store a data frame sequence, identification information, a data migration request, historical data information, and the like, and may be further configured to provide appropriate data for data transmission and beam adjustment.

In a specific implementation, the present disclosure further provides a computer storage medium. The computer storage medium may store a program, and when the program is executed, some or all of the operations in the embodiments of the data transmission method provided in the present disclosure can be performed. The storage medium may be a magnetic disk, an optical disc, a ROM, a RAM, or the like.

In addition, in the foregoing embodiments, the two network devices for data transmission in the network system may be any device having wireless transmission and reception functions, including but not limited to a NodeB, an evolved NodeB (eNodeB), a base station in a fifth generation (5G) communications system, a base station or a network device in a future communications system, an access node in a Wi-Fi system, a wireless relay node, a wireless backhaul node, and user equipment (UE).

The UE may also be referred to as a terminal, a mobile station (MS), a mobile terminal (MT), a remote terminal (RT), an access terminal (AT), a user agent (UA), or the like. The UE may communicate with one or more core networks by using a radio access network (RAN), or may access a distributed network in a self-organizing or grant-free manner. The UE may alternatively access a radio network in another manner for communication, or may directly perform wireless communication with another UE. This is not limited in this embodiment of the present disclosure.

The data transmission method provided in the embodiments of the present disclosure may be applied to downlink data transmission, may be applied to uplink data transmission, and may also be applied to device-to-device (D2D) data transmission. For the downlink data transmission, a transmit device is a base station, and a corresponding receive device is UE. For the uplink data transmission, a transmit device is UE, and a corresponding receive device is a base station. For the D2D data transmission, a transmit device is UE, and a corresponding receive device is also UE. This is not limited in the embodiments of the present disclosure.

In addition, the present disclosure further provides a transmission system, used for beam switching and data transmission. The system includes at least two network devices. Each network device may be the network device shown in FIG. 13, or may include the transmit device shown in FIG. 11 and/or the receive device shown in FIG. 12. configured to implement the data transmission methods in Embodiment 1 and Embodiment 2 of the present disclosure.

A person skilled in the art may clearly understand that, the technologies in the embodiments of the present disclosure may be implemented by software in addition to an appropriate general-purpose hardware platform. Based on such an understanding, the technical solutions of the present disclosure essentially or the part contributing to the prior art may be implemented in a form of a software product. The computer software product is stored in a storage medium, such as a ROM/RAM, a magnetic disk, or an optical disc, and includes several instructions for instructing a computer device (which may be a personal computer, a server, or a network device) to perform the methods described in the embodiments or some parts of the embodiments of the present disclosure.

For same or similar parts in the embodiments in this specification, refer to the relevant parts. Especially, the foregoing embodiments of the present disclosure are basically similar to the method embodiments, and therefore are described briefly. For related parts, refer to the descriptions in the method embodiments.

The foregoing implementations of the present disclosure are not intended to limit the protection scope of the present disclosure.

What is claimed is:

1. A data transmission method, comprising:
generating, by a first transmit device, a first data frame sequence, wherein the first data frame sequence comprises a first data frame, the first data frame comprises a switching interval, the switching interval comprises first identification information, and the first data frame corresponds to a first data period;
detecting, by the first transmit device, whether a beam adjustment request is received within the first data period, and if the beam adjustment request is received, setting the first identification information in the switching interval of the first data frame to invalid, including, filling, by the first transmit device, invalid data in a first payload area of the first data frame, and performing beam adjustment within the first data period; or if no beam adjustment request is received within the first data period, setting the first identification information to valid, including, filling valid data in the first payload area of the first data frame, wherein the switching interval comprises a first interval header and the first payload area, and the first identification information is located in the first interval header and is used to indicate validity of data in the first payload area of the switching interval in which the first identification information is located; and
sending, by the first transmit device, the first data frame.

2. The method according to claim 1, wherein
before sending, by the first transmit device, the first data frame, the method further comprises:
setting validity of second identification information in the first data frame, wherein the first data frame further comprises a protection interval, the protection interval comprises a second interval header and a second payload area, and the second interval header comprises the second identification information, used to indicate validity of data in the second payload area of the first data frame.

3. The method according to claim 2, wherein setting validity of the second identification information in the first data frame comprises:
determining, by the first transmit device, a first target switching interval based on a transmission delay and/or location information, wherein the first target switching interval is a switching interval of an $N^{th}$ data frame before the first data frame, or is the switching interval of the first data frame, wherein $N≥1$, wherein the first transmit device is located in a first network device, and the first network device further comprises a first receive device; and
if a first data migration request is received from the first receive device or if a first data migration identifier in a first data migration request received from the first receive device is true, and first identification information in the first target switching interval is valid, setting the second identification information in the protection interval of the first data frame to invalid; otherwise, setting the second identification information to valid.

4. The method according to claim 3, wherein the method further comprises:
if the second identification information in the first data frame is invalid, migrating, by the first transmit device, data in a first payload area of the first target switching interval to the second payload area of the protection interval of the first data frame, wherein a length of the second payload area of the first data frame is greater than or equal to a length of the first payload area of the first target switching interval.

5. The method according to claim 2, wherein setting validity of the second identification information in the first data frame comprises:
in response to receiving a second data migration request from a second receive device, setting, by the first transmit device, the second identification information in the first data frame to invalid; otherwise, setting the second identification information to valid, wherein the first transmit device is located in a first network device and the second receive device is located in a second network device; or
in response to receiving a second data migration request, and a second data migration identifier carried in the second data migration request is true, setting, by the first transmit device, the second identification information in the first data frame to invalid; otherwise, setting the second identification information to valid.

6. The method according to claim 5, wherein the method further comprises:
if the second identification information in the first data frame is invalid, determining, by the first transmit device, a first target switching interval based on a transmission delay and/or location information, wherein the first target switching interval is a switching interval of an $N^{th}$ data frame before the first data frame, or is the switching interval of the first data frame, wherein $N≥1$; and
migrating data in a first payload area of the first target switching interval to the second payload area of the protection interval of the first data frame, wherein a length of the second payload area of the first data frame is greater than or equal to a length of the first payload area of the first target switching interval.

7. The method according to claim 4, wherein the method further comprises:
when receiving a start instruction, migrating, by the first transmit device, to-be-migrated data to a second payload area of a protection interval corresponding to each data frame, starting from migrating the data in the first payload area of the first target switching interval to the second payload area of the first data frame; and
when receiving a stop instruction, stopping, by the first transmit device, data migration starting from a next data frame.

8. A transmit device, comprising:
a memory storing instructions; and
a processor coupled to the memory, the processor configured to execute the instructions stored in the memory to cause the transmit device to perform operations comprising:
generating a first data frame sequence, wherein the first data frame sequence comprises a first data frame, the first data frame comprises a switching interval, the switching interval comprises first identification information, and the first data frame corresponds to a first data period;
detecting whether a beam adjustment request is received within the first data period, and if the beam adjustment request is received, setting the first identification information in the switching interval of the first data frame to invalid, including, filling invalid data in a first payload area of the first data frame, and performing beam adjustment within the first data period; or if no beam adjustment request is received within the first data period, setting the first identification information to valid, including, filling valid data in the first payload area of the first data frame, wherein the switching interval comprises a first interval header and the first payload area, and the first identification information is located in the first interval header and is used to indicate validity of data in the first payload area of the switching interval in which the first identification information is located; and sending the first data frame.

9. The transmit device according to claim 8, wherein before sending the first data frame, the operations further comprise:

setting validity of second identification information in the first data frame, wherein the first data frame further comprises a protection interval, the protection interval comprises a second interval header and a second payload area, and the second interval header comprises the second identification information, used to indicate validity of data in the second payload area of the first data frame.

10. The transmit device according to claim 9, wherein setting validity of the second identification information in the first data frame comprises:

determining, by the first transmit device, a first target switching interval based on a transmission delay and/or location information, wherein the first target switching interval is a switching interval of an $N^{th}$ data frame before the first data frame, or is the switching interval of the first data frame, wherein $N \geq 1$, wherein the first transmit device is located in a first network device, and the first network device further comprises a first receive device; and if a first data migration request is received from the first receive device or if a first data migration identifier in a first data migration request received from the first receive device is true, and first identification information in the first target switching interval is valid, setting the second identification information in the protection interval of the first data frame to invalid; otherwise, setting the second identification information to valid.

11. The transmit device according to claim 10, wherein the operations further comprise:

if the second identification information in the first data frame is invalid, migrating, by the first transmit device, data in a first payload area of the first target switching interval to the second payload area of the protection interval of the first data frame, wherein a length of the second payload area of the first data frame is greater than or equal to a length of the first payload area of the first target switching interval.

12. The transmit device according to claim 9, wherein setting validity of the second identification information in the first data frame comprises:

in response to receiving a second data migration request from a second receive device, setting, by the first transmit device, the second identification information in the first data frame to invalid; otherwise, setting the second identification information to valid, wherein the first transmit device is located in a first network device and the second receive device is located in a second network device; or in response to receiving a second data migration request, and a second data migration identifier carried in the second data migration request is true, setting, by the first transmit device, the second identification information in the first data frame to invalid; otherwise, setting the second identification information to valid.

13. A non-transitory computer storage medium having instructions stored therein, which when executed by one or more processors, cause the one or more processors to perform operations, the operations comprising:

generating a first data frame sequence, wherein the first data frame sequence comprises a first data frame, the first data frame comprises a switching interval, the switching interval comprises first identification information, and the first data frame corresponds to a first data period;

detecting whether a beam adjustment request is received within the first data period, and if the beam adjustment request is received, setting the first identification information in the switching interval of the first data frame to invalid, including, filling invalid data in a first payload area of the first data frame, and performing beam adjustment within the first data period; or if no beam adjustment request is received within the first data period, setting the first identification information to valid, including, filling valid data in the first payload area of the first data frame, wherein the switching interval comprises a first interval header and the first payload area, and the first identification information is located in the first interval header and is used to indicate validity of data in the first payload area of the switching interval in which the first identification information is located; and causing a first transmit device to send the first data frame.

14. The non-transitory computer storage medium according to claim 13, wherein before causing the first transmit device to send the first data frame, the operations further comprise:

setting validity of second identification information in the first data frame, wherein the first data frame further comprises a protection interval, the protection interval comprises a second interval header and a second payload area, and the second interval header comprises the second identification information, used to indicate validity of data in the second payload area of the first data frame.

15. The non-transitory computer storage medium according to claim 14, wherein setting validity of the second identification information in the first data frame comprises:

determining a first target switching interval based on a transmission delay and/or location information, wherein the first target switching interval is a switching interval of an $N^{th}$ data frame before the first data frame, or is the switching interval of the first data frame, wherein $N \geq 1$, wherein the first transmit device is located in a first network device, and the first network device further comprises a first receive device; and if a first data migration request is received from the first receive device or if a first data migration identifier in a first data migration request received from the first receive device is true, and first identification information in the first target switching interval is valid, setting the second identification information in the protection interval of the first data frame to invalid; otherwise, setting the second identification information to valid.

16. The non-transitory computer storage medium according to claim 15, wherein the operations further comprise:

if the second identification information in the first data frame is invalid, migrating data in a first payload area of the first target switching interval to the second payload area of the protection interval of the first data frame, wherein a length of the second payload area of the first data frame is greater than or equal to a length of the first payload area of the first target switching interval.

17. The non-transitory computer storage medium according to claim 14, wherein setting validity of the second identification information in the first data frame comprises:
- in response to receiving a second data migration request from a second receive device, setting the second identification information in the first data frame to invalid; otherwise, setting the second identification information to valid, wherein the first transmit device is located in a first network device and the second receive device is located in a second network device; or
- in response to receiving a second data migration request, and a second data migration identifier carried in the second data migration request is true, setting the second identification information in the first data frame to invalid; otherwise, setting the second identification information to valid.

* * * * *